(12) United States Patent
Shimazaki et al.

(10) Patent No.: US 8,170,752 B2
(45) Date of Patent: May 1, 2012

(54) PARKING ASSISTANCE APPARATUS, VEHICLE-SIDE APPARATUS OF PARKING ASSISTANCE APPARATUS, PARKING ASSIST METHOD, AND PARKING ASSIST PROGRAM

(75) Inventors: Kazunori Shimazaki, Aichi (JP); Tomio Kimura, Aichi (JP); Yutaka Nakashima, Aichi (JP); Masami Tomioka, Aichi (JP); Hideo Yanagisawa, Aichi (JP)

(73) Assignee: Kabushiki Kaisha Toyota Jidoshokki, Aichi (JP)

( * ) Notice: Subject to any disclaimer, the term of this patent is extended or adjusted under 35 U.S.C. 154(b) by 275 days.

(21) Appl. No.: 12/670,713

(22) PCT Filed: Jul. 4, 2008

(86) PCT No.: PCT/JP2008/062194
§ 371 (c)(1),
(2), (4) Date: Mar. 23, 2010

(87) PCT Pub. No.: WO2009/016925
PCT Pub. Date: Feb. 5, 2009

(65) Prior Publication Data
US 2010/0211267 A1  Aug. 19, 2010

(30) Foreign Application Priority Data

Jul. 31, 2007 (JP) .................................. 2007-199078
Nov. 14, 2007 (JP) .................................. 2007-295802

(51) Int. Cl.
*A01B 69/00* (2006.01)
*B62D 6/00* (2006.01)
*B62D 12/00* (2006.01)
*G05D 1/02* (2006.01)

(52) U.S. Cl. ......................................... 701/42; 701/300

(58) Field of Classification Search ..................... 701/41, 701/42, 300, 301
See application file for complete search history.

(56) References Cited

U.S. PATENT DOCUMENTS 7,363,130 B2 * 4/2008 Sakakibara ..................... 701/36
(Continued)

FOREIGN PATENT DOCUMENTS
JP 2000-177512 6/2000
(Continued)

*Primary Examiner* — James Trammell
*Assistant Examiner* — Michael D Lang
(74) *Attorney, Agent, or Firm* — Greenblum & Bernstein, P.L.C.

(57) ABSTRACT

A parking assistance apparatus makes it easy for a driver to grasp a relative positional relation between a vehicle and a target parking position and makes it possible to park the vehicle at the target parking position in a parking space with accuracy.

An image of a mark M in a parking space S is taken by a vehicle-side camera 7. A relative position calculation portion 8 calculates a relative positional relation between the vehicle and a target parking position T based on the taken image of the mark M. A backward locus calculation portion 9 calculates an expected locus when the vehicle moves based on the relative positional relation and based on a steering angle detected by a steering angle sensor 15. An image of the parking space S is taken by a parking-space-side camera 3 and transmitted to a vehicle-side apparatus 1. An image composition portion 12 composes the image of the parking space S from the parking-space-side camera 3 and the expected locus calculated by the backward locus calculation portion 9. The composed image is displayed on the monitor 14 located in the vicinity of a drivers seat of the vehicle.

25 Claims, 27 Drawing Sheets

U.S. PATENT DOCUMENTS

| | | | |
|---|---|---|---|
| 2002/0084916 A1* | 7/2002 | Shimizu et al. | 340/932.2 |
| 2003/0074129 A1* | 4/2003 | Curbow et al. | 701/200 |
| 2005/0240323 A1* | 10/2005 | Orita | 701/28 |
| 2006/0136109 A1 | 6/2006 | Tanaka et al. | |
| 2006/0287826 A1* | 12/2006 | Shimizu et al. | 701/216 |
| 2007/0146166 A1* | 6/2007 | Sato et al. | 340/932.2 |

FOREIGN PATENT DOCUMENTS

| | | |
|---|---|---|
| JP | 2007-148472 | 6/2007 |
| JP | 2007-161118 | 6/2007 |
| JP | 2007-161119 | 6/2007 |

\* cited by examiner

PARKING ASSISTANCE APPARATUS, VEHICLE-SIDE APPARATUS OF PARKING ASSISTANCE APPARATUS, PARKING ASSIST METHOD, AND PARKING ASSIST PROGRAM

TECHNICAL FIELD

The present invention relates to a parking assistance apparatus and, in particular, to a parking assistance apparatus which allows a driver to grasp a relative positional relation between a vehicle and a target parking position when the vehicle is backing up to park.

The present invention also relates to a vehicle-side apparatus of such a parking assistance apparatus.

Further, the present invention relates to a parking assist method for assisting parking in such a manner and a parking assist program for execution by a computer.

BACKGROUND ART

Conventionally, a steering assistance apparatus has been developed which assists drive operation by displaying a rear view from a vehicle taken by a camera mounted on the vehicle on a monitor and superimposing on the monitor an expected locus when a vehicle is backing up in response to information such as related to steering angle detected by a steering angle sensor. According to such a steering assistance apparatus, a driver, for example, can park into a parking space by driving the vehicle while viewing the expected locus on a monitor. However, the driver cannot easily grasp the positional relation between the target parking space and the vehicle because the rear view taken by the camera mounted on the vehicle changes in the screen of the monitor as the vehicle proceeds.

Therefore, Patent Documents 1-3, for example, disclose a parking assistance apparatus for taking an image of an area around the entrance of a parking space by a fixed camera mounted at the parking facility side, transmitting the taken image data to the vehicle side to display a data on the display portion of the vehicle, calculating a leading locus from the position of the vehicle to a target parking position in the parking space, and displaying the leading locus superimposed on the taken image data. The vehicle backs up to the target parking position, and when the vehicle reaches an area around the entrance of the parking space, the vehicle is displayed in the image taken by the fixed camera of the parking facility side. Then the parking is performed by moving the vehicle along the leading locus. As the image taken by the fixed camera is fixed regardless of movement of the vehicle, it becomes easier for the driver to grasp the positional relation between the target parking position and the vehicle.

[Patent Document 1] JP 2007-148472 A
[Patent Document 2] JP 2007-161118 A
[Patent Document 3] JP 2007-161119 A

DISCLOSURE OF THE INVENTION

Problems to be Solved by the Invention

In order to calculate a leading locus from the position of a vehicle to a target parking position as disclosed in Patent Documents 1-3, a relative positional relation between the vehicle and the target parking position needs to be identified. However, it is difficult to identify the position of the vehicle with accuracy by attempting to recognize the vehicle that appears in the image taken by the fixed camera mounted at the parking facility side because vehicles have respectively different shapes, sizes, colors, etc. Although license plates attached to each vehicle have a common rectangular shape and a common size regardless of the vehicle, it is difficult to identify the relative positional relation between the position of the vehicle and the target parking position with accuracy in the case where the contour of the license plate cannot be recognized clearly, e.g. where the license plate and the vehicle body around it are of the same color, even if the license plate is used as a clue.

Thus, there is a problem that it is difficult to lead a vehicle to a target parking position with accuracy by calculating an appropriate leading route.

Also, the apparatus of Patent Document 1 guides a steering angle for aligning the vehicle with the leading route by means of sound or the like based on a signal received from a steering sensor. However, in this case, it is difficult to grasp excess and deficient actual steering angle with reference to the guided steering angle, so it is difficult to park the vehicle with accuracy even if the leading route is appropriate.

The present invention has been made in light of such conventional problems, and has an object to provide a parking assistance apparatus and a vehicle-side apparatus of the parking assistance apparatus which make it easier for a driver to grasp the relative positional relation between a vehicle and a target parking position and make it possible for the driver to park the vehicle at the target parking position with accuracy.

Also, the present invention has an object to provide a parking assist method for performing such parking assistance and a parking assist program for execution by a computer.

Means for Solving the Problems

A parking assistance apparatus according to the present invention comprises a parking-space-side apparatus and a vehicle-side apparatus, wherein:

the parking-space-side apparatus includes: a fixed target that is fixed with a predetermined positional relation with respect to a target parking position in a parking space and has at least one characteristic point; a parking-space-side camera for taking an image of the parking space; and a parking-space-side communication portion for transmitting an image taken by the parking-space-side camera; and the vehicle-side apparatus includes: a vehicle-side camera for taking an image of the fixed target; a vehicle-side communication portion for receiving the image transmitted by the parking-space-side communication portion; a monitor located in the vicinity of a drivers seat; a steering angle sensor for detecting a steering angle of a vehicle, a relative position calculation portion for calculating a relative positional relation between the vehicle and the target parking position based on an image of the fixed target taken by the vehicle-side camera; an expected locus calculation portion for calculating an expected locus when the vehicle moves based on the steering angle detected by the steering angle sensor; and an image composition portion for displaying on the monitor information regarding parking superimposed on a background image, wherein the information regarding parking is obtained based on the relative positional relation between the vehicle and the target parking position calculated by the relative position calculation portion and based on the expected locus calculated by the expected locus calculation portion, and wherein the background image is based on the image received at the vehicle-side communication portion.

Also, the parking-space-side apparatus may be constructed so as to include a plurality of the fixed targets located at different positions; and the relative position calculation portion calculates the relative positional relation between the vehicle and the target parking position based on any of the images of the fixed targets taken by the vehicle-side camera.

The vehicle-side apparatus may include an image selection portion, wherein the image selection portion: selects an image from the vehicle-side camera if the distance between the vehicle and the target parking position is larger than a predetermined value; and selects an image from the image composition portion if the distance is less than or equal to the predetermined value, based on the relative positional relation between the vehicle and the target parking position calculated by the relative position calculation portion, and makes the monitor display the selected image.

The vehicle-side apparatus may further include a sensor related to travel of the vehicle, and an automatic steering apparatus may create a steering signal for steering the vehicle automatically based on a detection signal from the sensor related to travel of the vehicle and based on the parking locus calculated by the parking locus calculation portion.

The vehicle-side apparatus may further includes a sensor related to travel of the vehicle, and an automatic traveling apparatus may create a traveling signal for moving the vehicle automatically based on a detection signal from the sensor related to travel of the vehicle and based on the parking locus calculated by the parking locus calculation portion.

A vehicle-side apparatus of a parking assistance apparatus according to the present invention comprises: a vehicle-side camera for taking an image of a fixed target;

a vehicle-side communication portion for receiving an image transmitted by a parking-space-side apparatus, the parking-space-side apparatus including: a fixed target that is fixed with a predetermined positional relation with respect to a target parking position in a parking space and has at least one characteristic point; a parking-space-side camera for taking an image of the parking space; and a parking-space-side communication portion for transmitting an image taken by the parking-space-side camera;

a monitor located in the vicinity of a drivers seat; a steering angle sensor for detecting a steering angle of a vehicle, a relative position calculation portion for calculating a relative positional relation between the vehicle and the target parking position based on the image of the fixed target taken by the vehicle-side camera; an expected locus calculation portion for calculating an expected locus when the vehicle moves based on the steering angle detected by the steering angle sensor; and an image composition portion for displaying information regarding parking superimposed on a background image, wherein the information regarding parking is obtained based on the relative positional relation between the vehicle and the target parking position calculated by the relative position calculation portion and based on the expected locus calculated by the expected locus calculation portion, and wherein the background image is based on the image received at the vehicle-side communication portion.

A parking assist method according to the present invention comprises the steps of: taking an image of a parking space by a parking-space-side camera; transmitting the image of the parking space taken by the parking-space-side camera to a vehicle side, taking an image of a fixed target that is fixed with a predetermined positional relation with respect to a target parking position in a parking space and has at least one characteristic point by a vehicle-side camera; calculating a relative positional relation between the vehicle and the target parking position based on the image of the fixed target taken by the vehicle-side camera; detecting a steering angle of a vehicle; calculating an expected locus when the vehicle moves based on the detected steering angle; and displaying on the monitor information regarding parking superimposed on a background image, wherein the information regarding parking is obtained based on the calculated relative positional relation between the vehicle and the target parking position and based on the calculated expected locus, and wherein the background image is based on the image of the parking space taken by the vehicle-side camera.

A parking assist program according to the present invention is for executing the steps of: taking an image of a parking space by a parking-space-side camera; transmitting the image of the parking space taken by the parking-space-side camera to vehicle side, taking an image of a fixed target that is fixed with a predetermined positional relation with respect to a target parking position in a parking space and has at least one characteristic point by a vehicle-side camera; calculating a relative positional relation between the vehicle and the target parking position based on the image of the fixed target taken by the vehicle-side camera; detecting a steering angle of a vehicle; calculating an expected locus when the vehicle moves based on the detected steering angle; and displaying information regarding parking superimposed on a background image, wherein the information regarding parking is obtained based on the calculated relative positional relation between the vehicle and the target parking position and based on the calculated expected locus, and wherein the background image of the parking space is based on the image taken by the vehicle-side camera.

Effects of the Invention

According to the present invention, a driver can grasp the relative positional relation between the vehicle and the target parking position easily and it becomes possible for the driver to park the vehicle at the target parking position in the parking space with accuracy.

BEST MODE FOR CARRYING OUT THE INVENTION

Hereinafter, embodiments of the present invention will be described based on the accompanying drawings.

First Embodiment

Figure 1:
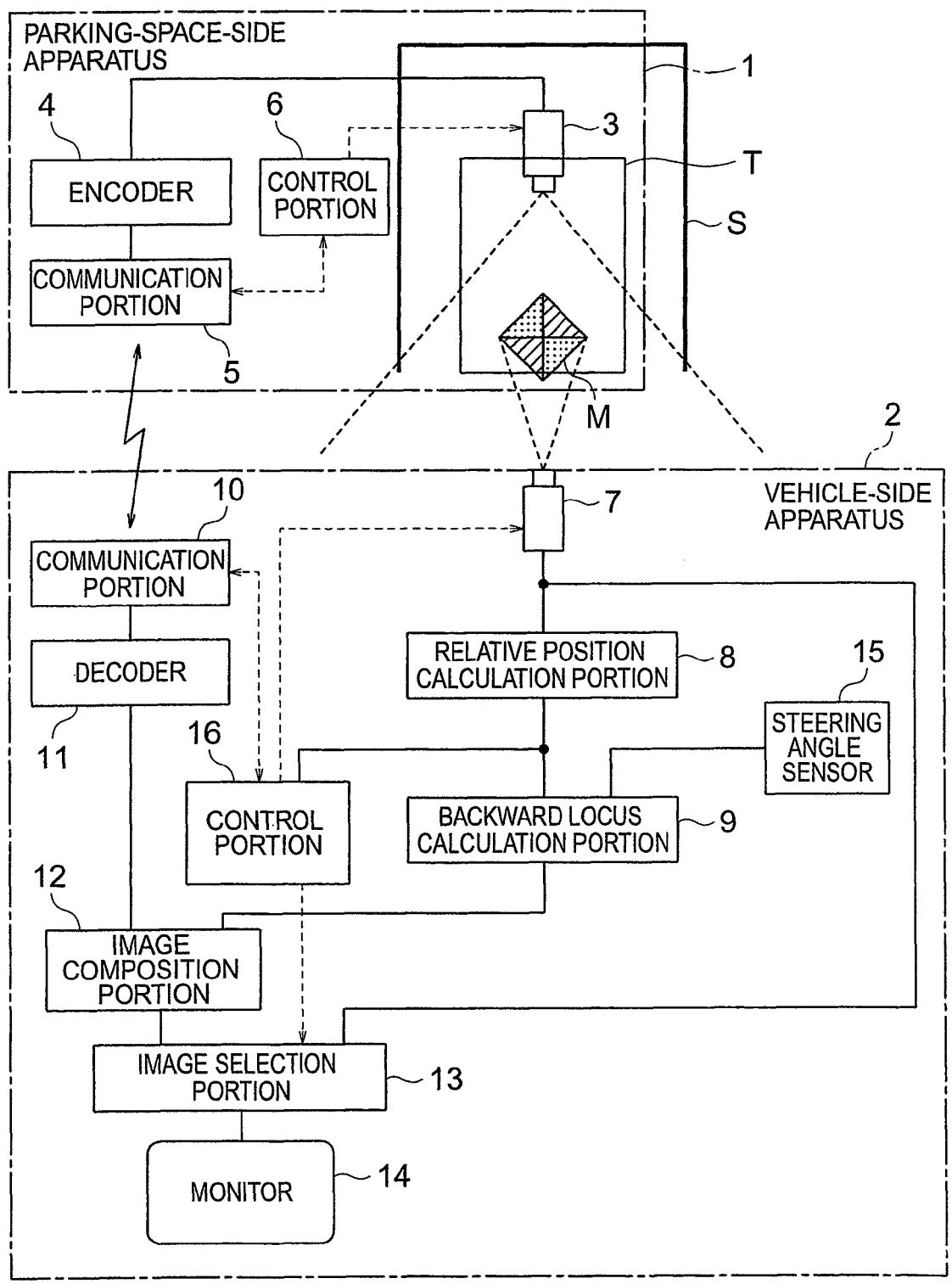
FIG. 1 is a block diagram showing a construction of a parking assistance apparatus according to a first embodiment of the present invention.

The construction of a parking assistance apparatus according to a first embodiment of the present invention is shown in FIG. 1. The parking assistance apparatus consists of a parking-space-side apparatus 1 located in or around a parking space S such as a garage and a vehicle-side apparatus 2 mounted on a vehicle which is to be parked in the parking space S.

The parking-space-side apparatus 1 has a parking-space-side camera 3 located at an inner side of the parking space S for taking an image of an area around an entrance of the parking space S. A communication portion (a parking-space-side communication portion) 5 is connected to the parking-space-side camera 3 via an encoder 4. The encoder 4 is for compressing the image taken by the parking-space-side camera 3 into a format suitable for wireless transmission. The communication portion 5 is a portion for transmitting the image data compressed by the encoder 4 to the vehicle-side apparatus 2. A control portion 6 is connected to the parking-space-side camera 3 and the communication portion 5. Further, the parking-space-side apparatus 1 has a mark M (fixed target) installed on a floor surface around the entrance of the parking space S.

It is assumed that internal parameters (focal length, distortion constant, etc.) and external parameters (relative position, angle, etc. with reference to the parking space S) of the parking-space-side camera 3 are known in advance. Similarly, it is assumed that a relative position of the mark M with reference to a target parking position T in the parking space S is known in advance.

On the other hand, the vehicle-side apparatus 2 has a vehicle-side camera 7 mounted on a rear portion of the vehicle for taking an image of a rear view from the vehicle. An image of the mark M in the parking space S is taken by the vehicle-side camera 7 when backing into the parking space S is performed. A relative position calculation portion 8 is connected to the vehicle-side camera 7 and a backward locus calculation portion 9 is connected to the relative position calculation portion 8. The backward locus calculation portion 9 functions as an expected locus calculation portion in the first embodiment. Also, the vehicle-side apparatus 2 has a communication portion 10 (vehicle-side communication portion) which communicates with the communication portion 5 of the parking-space-side apparatus 1. A decoder 11 is connected to the communication portion 10. The decoder 11 is for decoding the compressed image data from the parking-space-side apparatus 1 received at the communication portion 10.

An image composition portion 12 is connected to the backward locus calculation portion 9 and the decoder 11. An image selection portion 13 is connected to both the image composition portion 12 and the vehicle-side camera 7. A monitor 14 located in the vicinity of the drivers seat of the vehicle is connected to the image selection portion 13.

Also, a steering angle sensor 15 for detecting a steering angle of the vehicle is connected to the backward locus calculation portion 9.

Further, a control portion 16 is connected to the vehicle-side camera 7, the relative position calculation portion 8 and the communication portion 10.

It is assumed that internal parameters (focal length, distortion constant, etc.) and a relative position, an angle, etc. of the vehicle-side camera 7 with reference to the vehicle V are known in advance.

Figure 2:
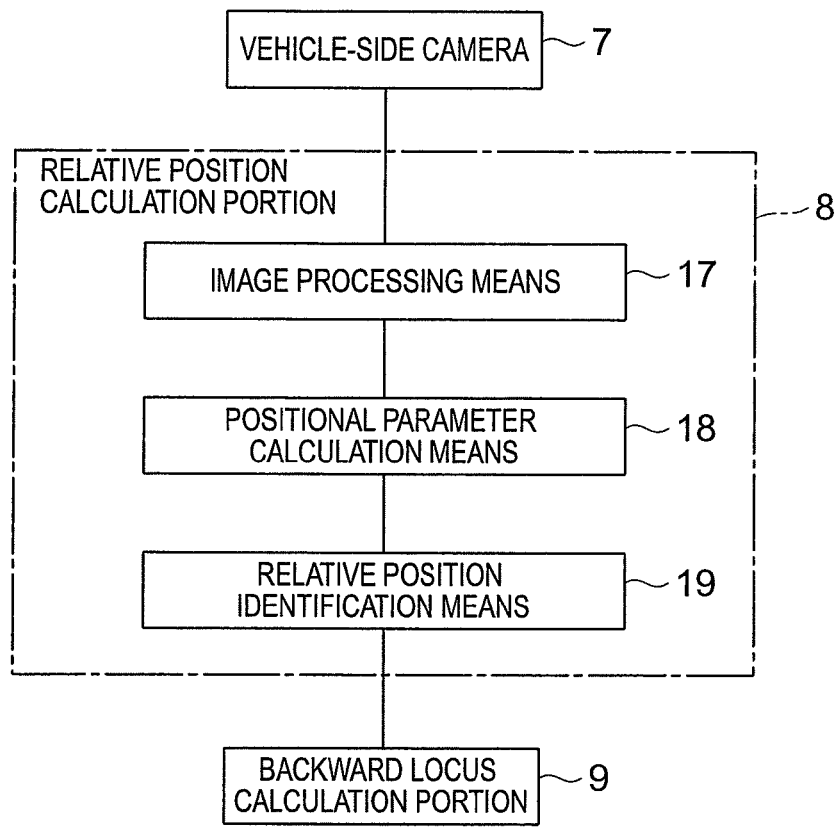
FIG. 2 is a block diagram showing a construction of a relative position calculation portion in the first embodiment.

As shown in FIG. 2, the relative position calculation portion 8 of the vehicle-side apparatus 2 consists of an image processing means 17, a positional parameter calculation means 18 and a relative position identification means 19 connected serially in this order between the vehicle-side camera 7 and the backward locus calculation portion 9.

Figure 3:
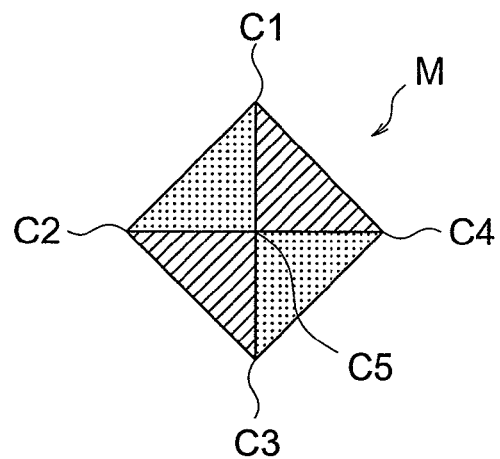
FIG. 3 shows a mark used in the first embodiment.

Also, the mark M of the parking-space-side apparatus 1 is installed at a predetermined position having a predetermined positional relation with reference to the parking space S, and it is assumed that the predetermined positional relation of the mark M with reference to the parking space S is grasped in advance. As this mark M, for instance, as shown in FIG. 3, it is possible to use a figure having an external form in a square shape in which four isosceles right-angled triangles are abutted against each other. Each isosceles right-angled triangle is given a color that is different from those of its adjacent isosceles right-angled triangles and this mark M has five characteristic points C1 to C5 formed by multiple side intersections.

Next, operation of the first embodiment will be described with respect to the flowchart of FIG. 4.

Figure 5:
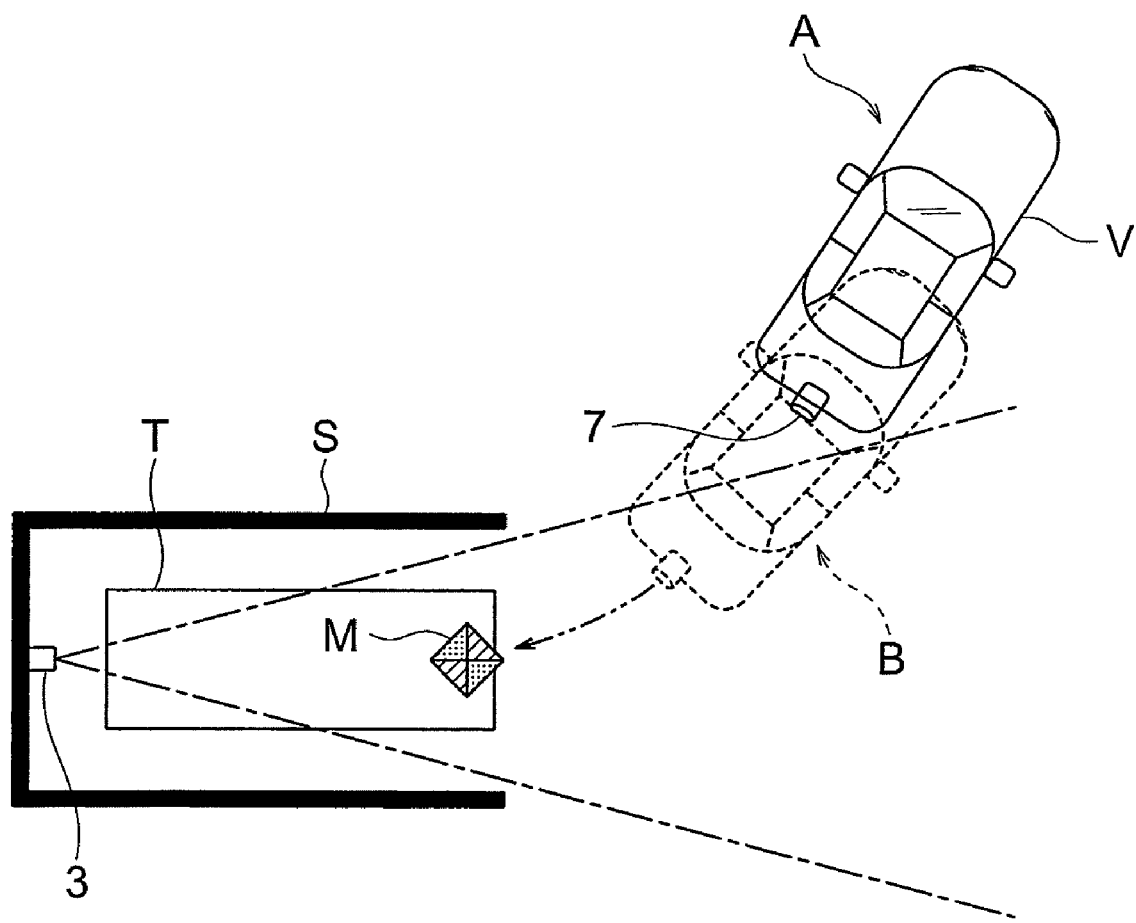
FIG. 5 is a plan view showing a positional relation between a parking space and a vehicle in the first embodiment.

First, in Step S1, as shown in FIG. 5, in a state in which the vehicle V is positioned at a location A in the vicinity of the parking space S with the mark M in the field of view of the vehicle-side camera 7, the vehicle-side camera 7 is operated by the control portion 16 of the vehicle-side apparatus 2 to take an image of the mark M.

Figure 6:
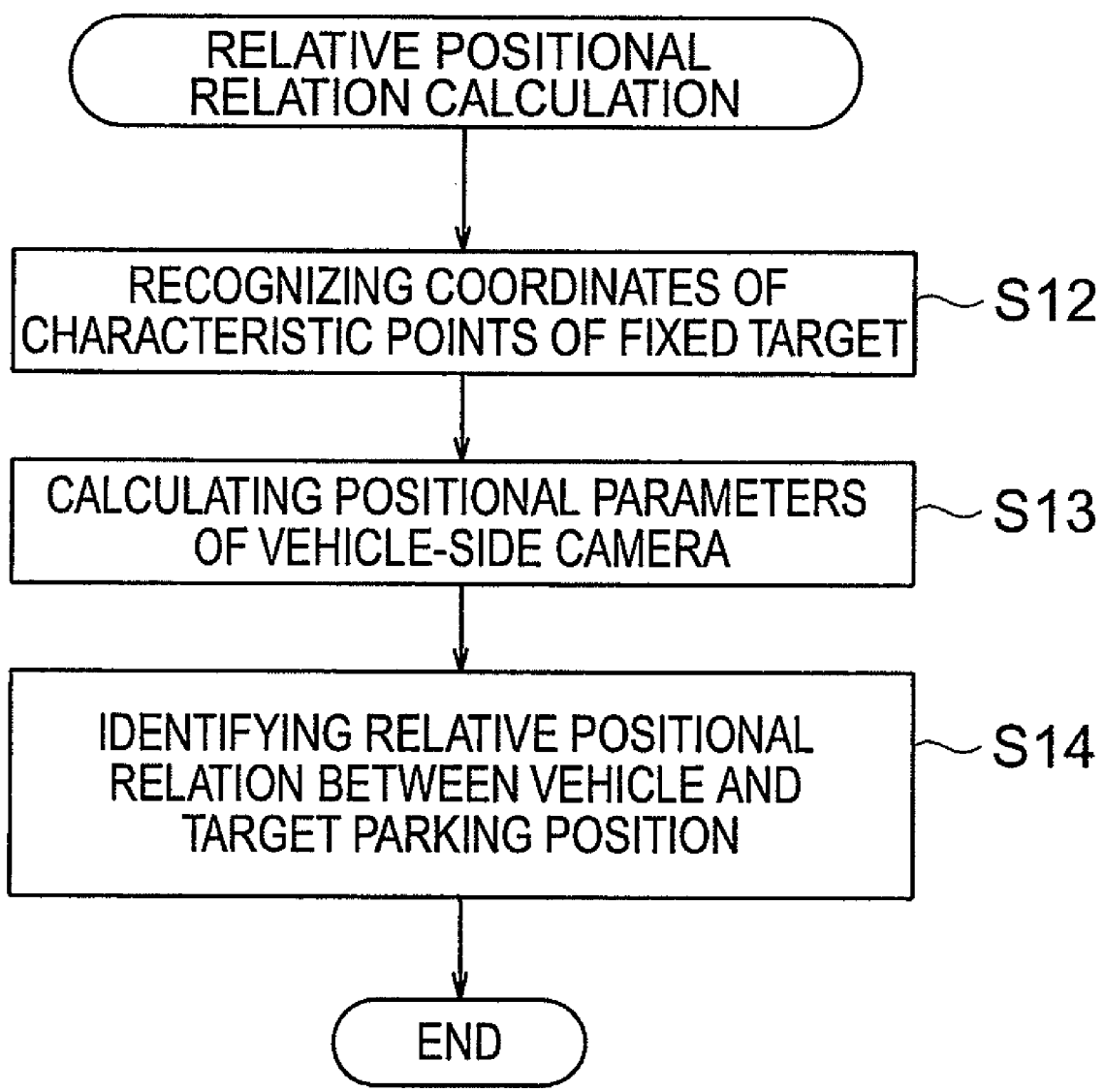
FIG. 6 is a flowchart showing an operation in a step for calculating a relative positional relation between the vehicle and the target parking position in the first embodiment.

The image taken by the vehicle-side camera 7 is inputted to the relative position calculation portion 8. In subsequent Step S2, the relative position calculation portion 8 calculates a relative positional relation between the vehicle V and the parking space S. Upon this, inside the relative position calculation portion 8, the calculation of the relative positional relation is performed according to Steps S12-S14 shown in FIG. 6 as described below.

That is, in Step S12, the image processing means 17 of the relative position calculation portion 8 extracts the five characteristic points C1 to C5 of the mark M from the image of the mark M taken by the vehicle-side camera 7 and recognizes and obtains each of two-dimensional coordinates of those characteristic points C1 to C5 on the image.

Next, in Step S13, based on the two-dimensional coordinates of each of the characteristic points C1 to C5 recognized by the image processing means 17, the positional parameter calculation means 18 calculates positional parameters including six parameters that are three-dimensional coordinates (x, y, z), a tilt angle (dip angle), a pan angle (direction angle) and a swing angle (rotation angle) of the vehicle-side camera 7 with reference to the mark M.

Here, a positional parameter calculation method by the positional parameter calculation means 18 will be described.

First, a point on the ground dropped from a center of a rear axle of the vehicle V vertically with respect to a road surface is set as an origin O, a road surface coordinate system is assumed in which an x axis and a y axis are set in a horizontal direction and a z axis is set in a vertical direction, and an image coordinate system is assumed in which an X axis and a Y axis are set on the image taken by the vehicle-side camera 7.

Coordinate values Xm and Ym (m=1 to 5) of the characteristic points C1 to C5 of the mark M in the image coordinate system are expressed by the following expressions from the six positional parameters of the characteristic points C1 to C5 of the mark M in the road surface coordinate system, in other words, coordinate values xm, ym and zm, and angle parameters Kn (n=1 to 3) that are the tilt angle (dip angle), the pan angle (direction angle) and the swing angle (rotation angle) described above using functions F and G.

$$Xm = F(xm, ym, zm, Kn) + DXm$$

$$Ym = G(xm, ym, zm, Kn) + DYm$$

Here, DXm and DYm are deviations between the X coordinates and the Y coordinates of the characteristic points C1 to C5 calculated using the functions F and G, and the coordinate values Xm and Ym of the characteristic points C1 to C5 recognized by the image processing means 17.

In other words, through expression of each of the X coordinates and the Y coordinates of the five characteristic points C1 to C5, ten relational expressions are created in total with respect to the six positional parameters (xm, ym, zm, Kn).

Therefore, the positional parameters (xm, ym, zm, Kn) are obtained which minimizes the following sum of squares of the deviations DXm and DYm.

$$S = \Sigma(DXm^2 + DYm^2)$$

In other words, an optimization problem that minimizes S is solved. It is possible to use a known optimization method such as a simplex method, a steepest descent method, a Newton method, or a quasi-Newton method.

It should be noted here that by creating relational expressions whose number is greater than the number "six" of the positional parameters (xm, ym, zm, Kn) to be calculated, the positional parameters are determined, so it becomes possible to obtain the positional parameters (xm, ym, zm, Kn) with accuracy.

In the first embodiment of the present invention, ten relational expressions are created for the six positional parameters (xm, ym, zm, Kn) from the five characteristic points C1 to C5, but it is sufficient that the number of the relational expressions is equal to or greater than the number of the positional parameters (xm, ym, zm, Kn) to be calculated and when six relational expressions are created from at least three characteristic points, it is possible to calculate six positional parameters (xm, ym, zm, Kn).

In Step S14, using the positional parameters of the vehicle-side camera 7 thus calculated, the relative position identification means 19 identifies a relative positional relation between the vehicle V and the target parking position T in the parking space S. That is, the relative positional relation between the vehicle-side camera 7 and the target parking position T is identified based on the positional parameters calculated by the positional parameter calculation means 18 and based on the predetermined positional relation between the mark M and the target position T in the parking space S grasped in advance and, further, the relative positional relation between the vehicle V and the target parking position T is identified because the predetermined positional relation between the vehicle-side camera 7 and the vehicle V is grasped in advance.

The relative positional relation between the vehicle V and the target parking position T thus calculated by the relative position calculation portion 8 is sent to the backward locus calculation portion 9. In Step S3 in the flowchart of FIG. 4, the backward locus calculation portion 9 is inputted a steering angle signal from the steering angle sensor 15 and calculates an expected backward locus with reference to a road surface for the case the vehicle V travels backward based on the relative positional relation between the vehicle V and the parking space S and based on a current steering angle obtained from the steering angle signal. The expected backward locus is an expected locus when the vehicle moves in the first embodiment. In the concrete, drawing data for drawing an expected backward locus on a road surface behind the vehicle is calculated by the backward locus calculation portion 9.

Next, in Step S4, the control portion 16 transmits a request signal for image data from the communication portion 10 to the parking-space-side apparatus 1.

At the parking-space-side apparatus 1, upon reception of the request signal for image data from the vehicle-side apparatus 2 by communication portion 5, the parking-space-side camera 3 is operated by the control portion 6 and an image of an area around the entrance of the parking space S is taken in Step S5. Then, the image data taken by the parking-space-side camera 3 is transmitted from the communication portion 5 to the vehicle-side apparatus 2 after being compressed by the encoder 4 into a form suitable for wireless transmission.

In Step S6, upon reception of the image data from the parking-space-side apparatus 1 by the communication portion 10 of the vehicle-side apparatus 2, the image data is sent to the image composition portion 12 after being decoded by the decoder 11.

In Step S7, the image composition portion 12 transforms the drawing data of the expected backward locus with reference to the road surface calculated by the backward locus calculation portion 9 based on the parameters of the parking-space-side camera 3 into drawing data in a coordinate system for an imaging screen of the parking-space-side camera 3. The image composition portion 12 then composes the transformed drawing data into the image data from the parking-space-side camera 3 sent by the decoder 11. As a result, composed data is created in which the expected backward locus of the vehicle V is superimposed on a background image of the area around the entrance of the parking space S taken by the parking-space-side camera 3.

The composed data created by the image composition portion 12 in this manner and the image data of the rear view from the vehicle taken by the vehicle-side camera 7 are inputted to the image selection portion 13.

Here, in Step S8, the control portion 16 compares a distance L between the current position of the vehicle V and the target parking position T with a predetermined value Lth based on the relative positional relation between the vehicle V and the target parking position T calculated by the relative positional relation calculation portion 8. If the distance L is larger than the predetermined value Lth, the control portion 16 makes the image selection portion 13 select the image data from the vehicle-side camera 7 in Step S9. As a result, the image of the rear view from the vehicle taken by the vehicle-side camera 7 is displayed on the screen of the monitor 14 in the vicinity of the drivers seat.

On the other hand, if the distance L between the current position of the vehicle V and the target parking position T is equal to or less than the predetermined value Lth, the control portion 16 makes the image selection portion 13 select the composed data from the image composition portion 12 in Step S10. As a result, the background image of the area around the entrance of the parking space S taken by the parking-space-side camera 3 and the expected backward locus of the vehicle V are superimposed and displayed on the screen of the monitor 14.

Then, it is determined in Step S11 whether to end the parking assistance. Steps S1-S10 are executed repeatedly until the vehicle V reaches the target parking position T and it is determined that the parking assistance should end.

It should be noted that the predetermined length Lth used in Step S8 may be set based on, for example as shown in FIG. 5, the distance between the position of the vehicle V and the target parking position T at the time a portion of the vehicle V comes into the field of view of the parking-space-side camera 3, assuming a garage where both side and an inner side of the parking space S are defined by walls or the like.

If the predetermined length Lth is set in this manner, when the vehicle is not in the field of view of the parking-space-side camera 3 as shown by vehicle position A in FIG. 5, the image of the rear view from the vehicle taken by the vehicle-side camera 7 is displayed on the screen of the monitor 14. After the vehicle V enters the field of view of the parking-space-side camera 3 as shown by the vehicle position B, a background image of the area around the entrance of the parking space S including at least a portion of the vehicle V taken by the parking-space-side camera 3 and the expected backward locus of the vehicle V are displayed on the screen of the monitor 14 superimposed as shown in FIG. 7.

Figure 7:
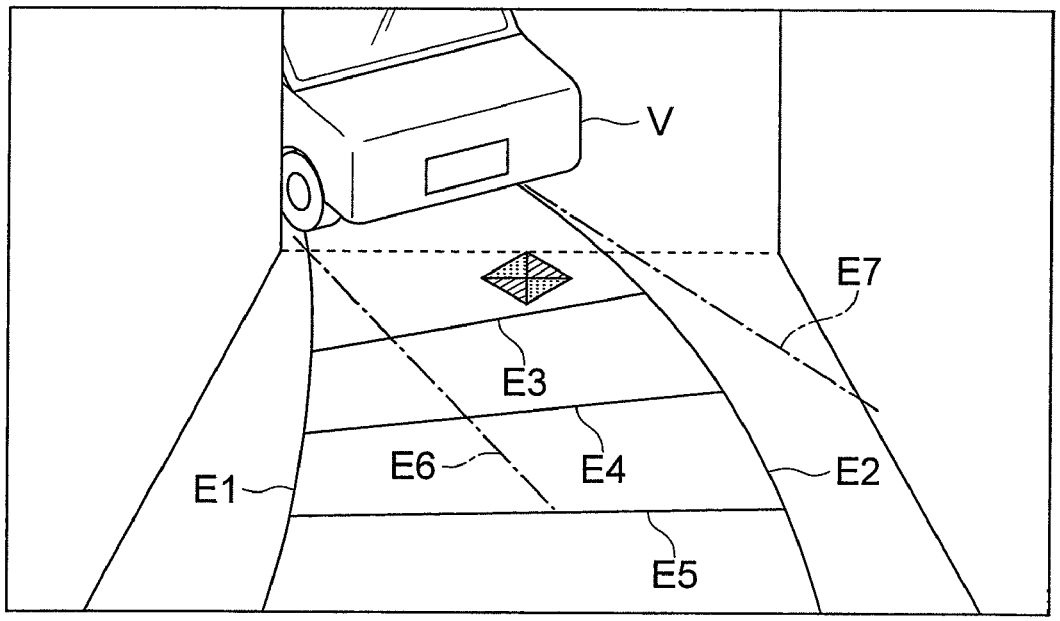
FIG. 7 shows a screen of a monitor in the first embodiment.

It should be noted that, in FIG. 7, the expected backward locus includes a left-right pair of vehicle width lines E1 and E2 which curve in response to a steering angle and line segments E3-E5 representing predetermined lengths from the rear end of the vehicle, e.g. 0.50 m, 1.0 m, and 2.0 m. Further, vehicle width lines E6 and E7 corresponding to straight backward travel are also superimposed.

Figure 8:
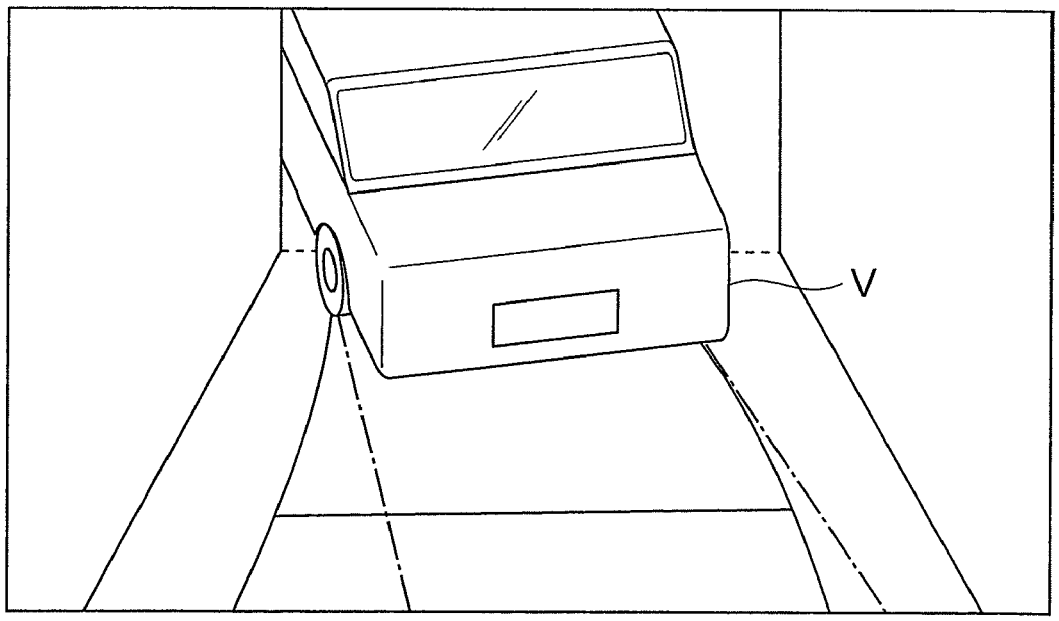
FIG. 8 shows a screen of a monitor in the first embodiment.

The background image of the area around the entrance of the parking space S taken by the parking-space-side camera 3 is fixed with reference to the screen of the monitor 14 regardless of progress of the vehicle V, so only the vehicle V moves in the background image as the vehicle V proceeds as shown in FIG. 8. This makes it easier for the driver to grasp the relative positional relation between the vehicle V and the target parking position T by viewing the vehicle, the parking space S and the expected backward locus displayed on the screen of the monitor 14. Therefore, the driver can park the vehicle V at the target parking position T in the parking space S with accuracy.

It should be noted that the relative position calculation portion 8, the backward locus calculation portion 9, the image composition portion 12, the image selection portion 13 and the control portion 16 of the vehicle-side apparatus 2 and the control portion 6 of the parking-space-side apparatus 1 may each be formed by a computer respectively. By recording the operations of Steps S1-S10 in FIG. 4 in a recording medium, each step can be executed by the computers.

Further, as the positional parameters consisting of the six parameters comprising the three-dimensional coordinates (x, y, z), tilt angle (dip angle), pan angle (direction angle) and swing angle (rotation angle) of the vehicle-side camera 7 with reference to the mark M in the first embodiment as mentioned above are calculated, the relative positional relation between the mark M and the vehicle V can be identified precisely and parking assistance can be provided with accuracy even if there is a gap or inclination between the floor surface of the parking space S where the mark M is located and the road surface of the current position below the vehicle V.

Nevertheless, if there is no inclination between the floor surface of the parking space S where the mark M is located and the road surface below the current position of the vehicle V, the relative positional relation between the mark M and the vehicle V can be identified by calculating positional parameters consisting of at least four parameters comprising the three-dimensional coordinates (x, y, z) and pan angle (direction angle) of the vehicle-side camera 7 with reference to the mark M. In this case, the four positional parameters can be determined by creating four relational expressions by two-dimensional coordinates of at least two characteristic points of the mark M. However, it is preferable to calculate the four positional parameters with accuracy using a minimum squares method or the like based on two-dimensional coordinates of a larger number of characteristic points.

Further, if the mark M and the vehicle V are on the same plane and there is no gap or inclination between the floor surface of the parking space S where the mark M is located and the road surface below the current position of the vehicle V, the relative positional relation between the mark M and the vehicle V can be identified by calculating positional parameters consisting of three parameters comprising two-dimensional coordinates (x, y) and pan angle (direction angle) of the vehicle-side camera 7 with reference to the mark M. Also in this case, the three positional parameters can be determined by creating four relational expressions by two-dimensional coordinates of at least two characteristic points of the mark M. However, it is preferable to calculate the three positional parameters with accuracy using a minimum squares method or the like based on two-dimensional coordinates of a larger number of characteristic points.

Second Embodiment

Figure 9:
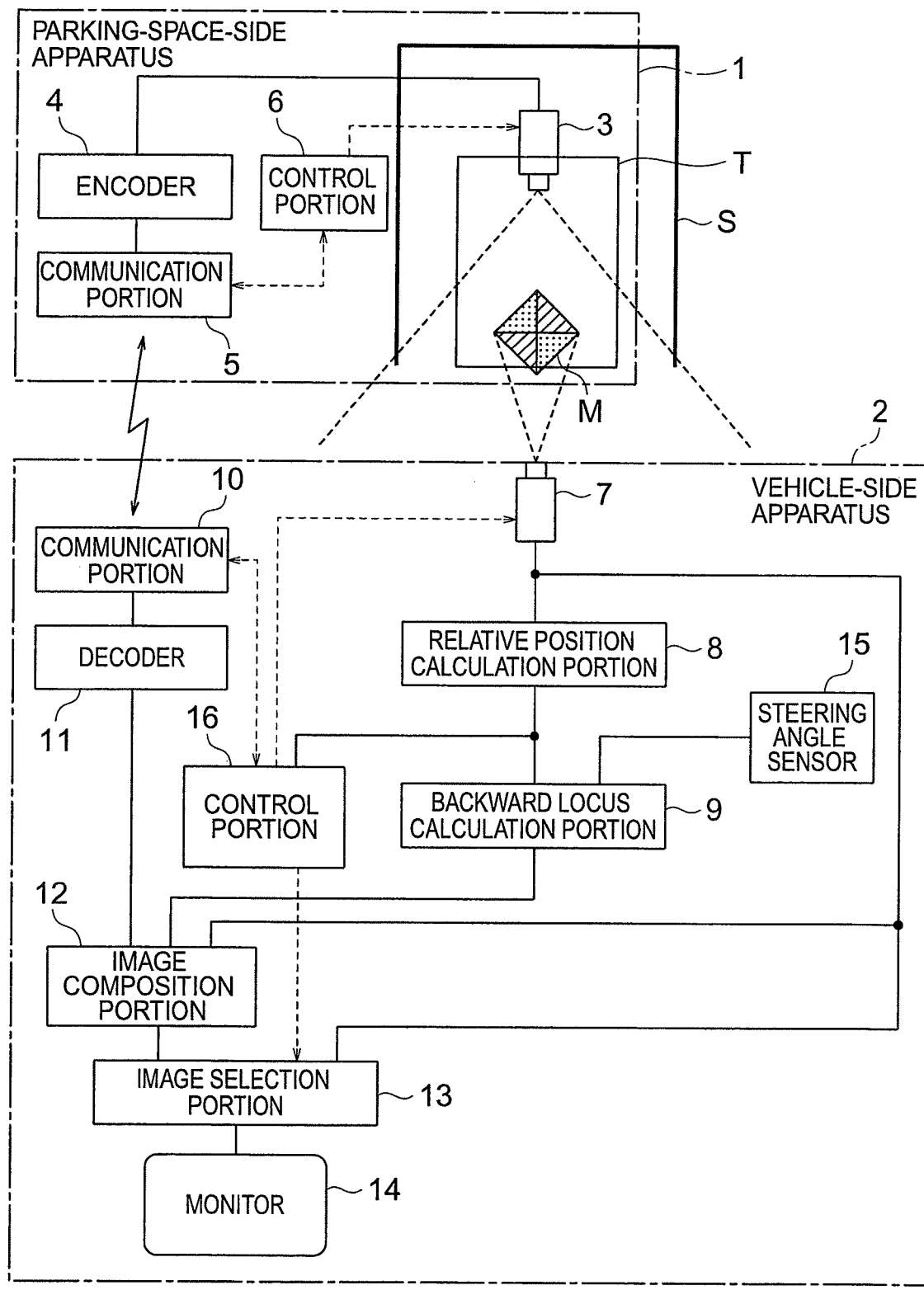
FIG. 9 is a block diagram showing a construction of a parking assistance apparatus according to a second embodiment.

The construction of a parking assistance apparatus according to a second embodiment is shown in FIG. 9. In this parking assistance apparatus, an image from the vehicle-side camera 7 is input to the image composition portion 12 in the apparatus of the first embodiment shown in FIG. 1. The image composition portion 12 composes the image from the vehicle-side camera 7 and the image from the parking-space-side camera 3 to generate a perspective image. Also, the image composition portion 12 further transforms the drawing data of the expected backward locus calculated by the backward locus calculation portion 9 into drawing data in the coordinate system of the perspective image. Further, the image composition portion 12 composes the transformed drawing data with the perspective image data.

An example of composing an image from the vehicle-side camera 7 and an image from the parking-space-side camera 3 and for generation of a perspective image is shown in Japanese Patent Application Laid-open No. 3-99952. Note that, in the second embodiment, a relative positional relation between the vehicle-side camera 7 and the parking-space-side camera 3 has to be determined and reflected in the composition of images from the cameras and the generation of the perspective image because the relative positional relation between the cameras varies in response to the current position of the vehicle V.

Figure 10:
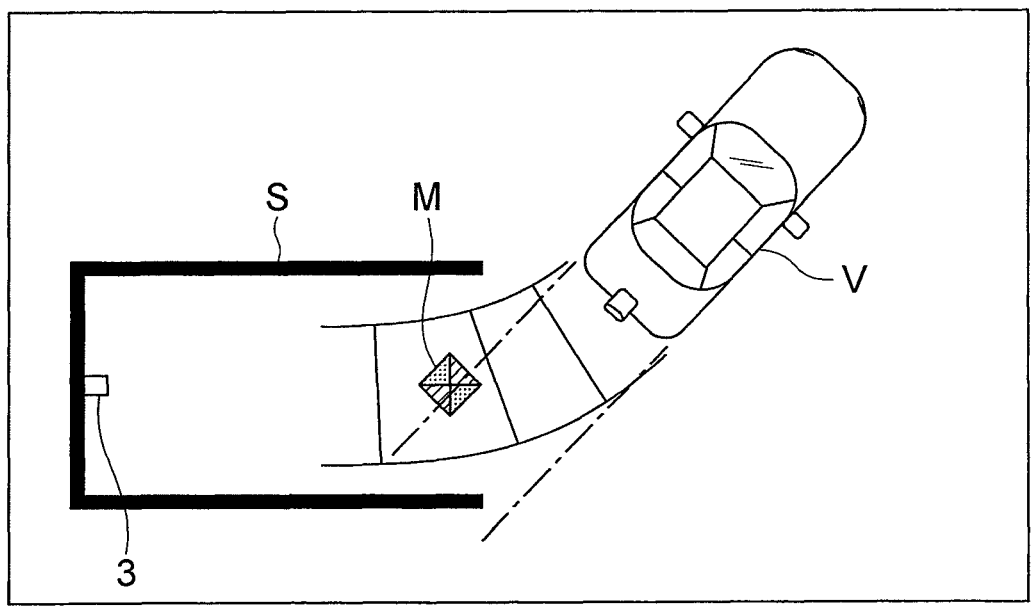
FIG. 10 shows a screen of a monitor in the second embodiment.

In this manner, composed data in which the expected backward locus of the vehicle V is superimposed on the perspective image is generated. As shown in FIG. 10, the perspective image with the superimposed expected backward locus of the vehicle V may be displayed on the screen of the monitor 14.

In this second embodiment, the perspective image is generated based on both the image from the vehicle-side camera 7 and the image from the parking-space-side camera 3. This decreases dead angle in comparison to the case where a perspective image is generated based only on the image from the vehicle-side camera. Also, the resolution of the generated perspective image can be improved if portions having higher resolution (e.g. positions nearer to respective camera) are selected for composition.

Third Embodiment

Figure 11:
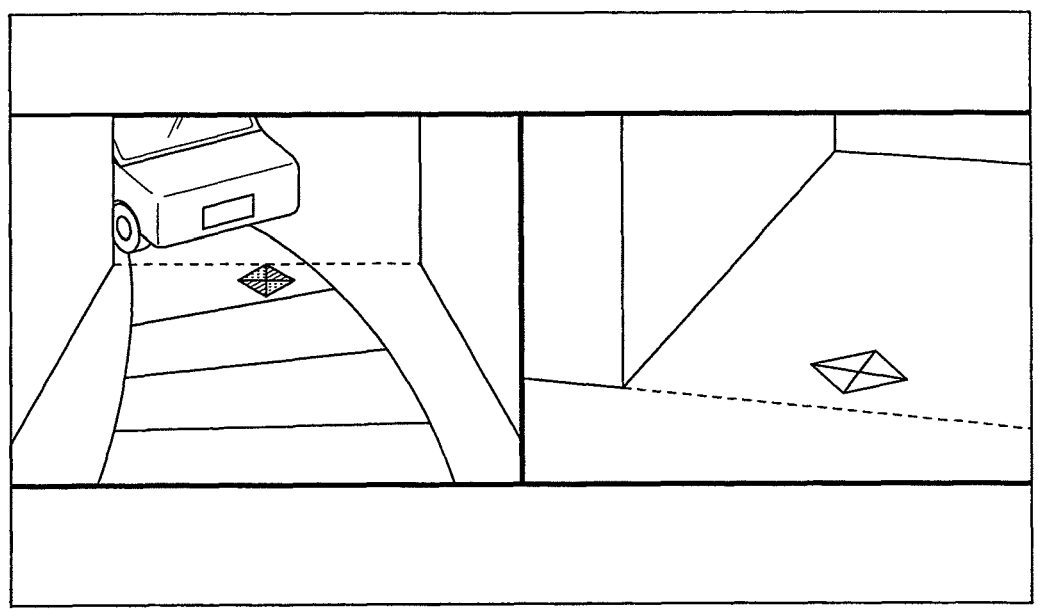
FIG. 11 shows a screen of a monitor in a third embodiment.

The first embodiment above switches between: the display of an image for the rear view from a vehicle taken by the vehicle-side camera 7; and a superimposed display of the background image of the area around the entrance of the parking space S taken by the parking-space-side camera 3 and an expected backward locus of the vehicle V, in response to the distance L between the current position of the vehicle V and the target parking position T. However, the construction is not limited to this. For example, as shown in FIG. 11, the screen of the monitor 14 may be separated into two portions, and the display of the image for the rear view from a vehicle taken by the vehicle-side camera 7 and the superimposed display of the background image of the area around the entrance of the parking space S taken by the parking-space-side camera 3 and an expected backward locus of the vehicle V may be displayed all the time regardless of the distance L between the current position of the vehicle V and the target parking position T. Also, they may be displayed concurrently.

It should be noted that a perspective image on which the expected backward locus of the vehicle V is superimposed, such as shown in the second embodiment, may be displayed all the time instead of the superimposed display of the background image of the area around the entrance of the parking space S taken by the parking-space-side camera 3 and an expected backward locus of the vehicle V, together with the image for the rear view from the vehicle taken by the vehicle-side camera 7.

Fourth Embodiment

Figure 12:
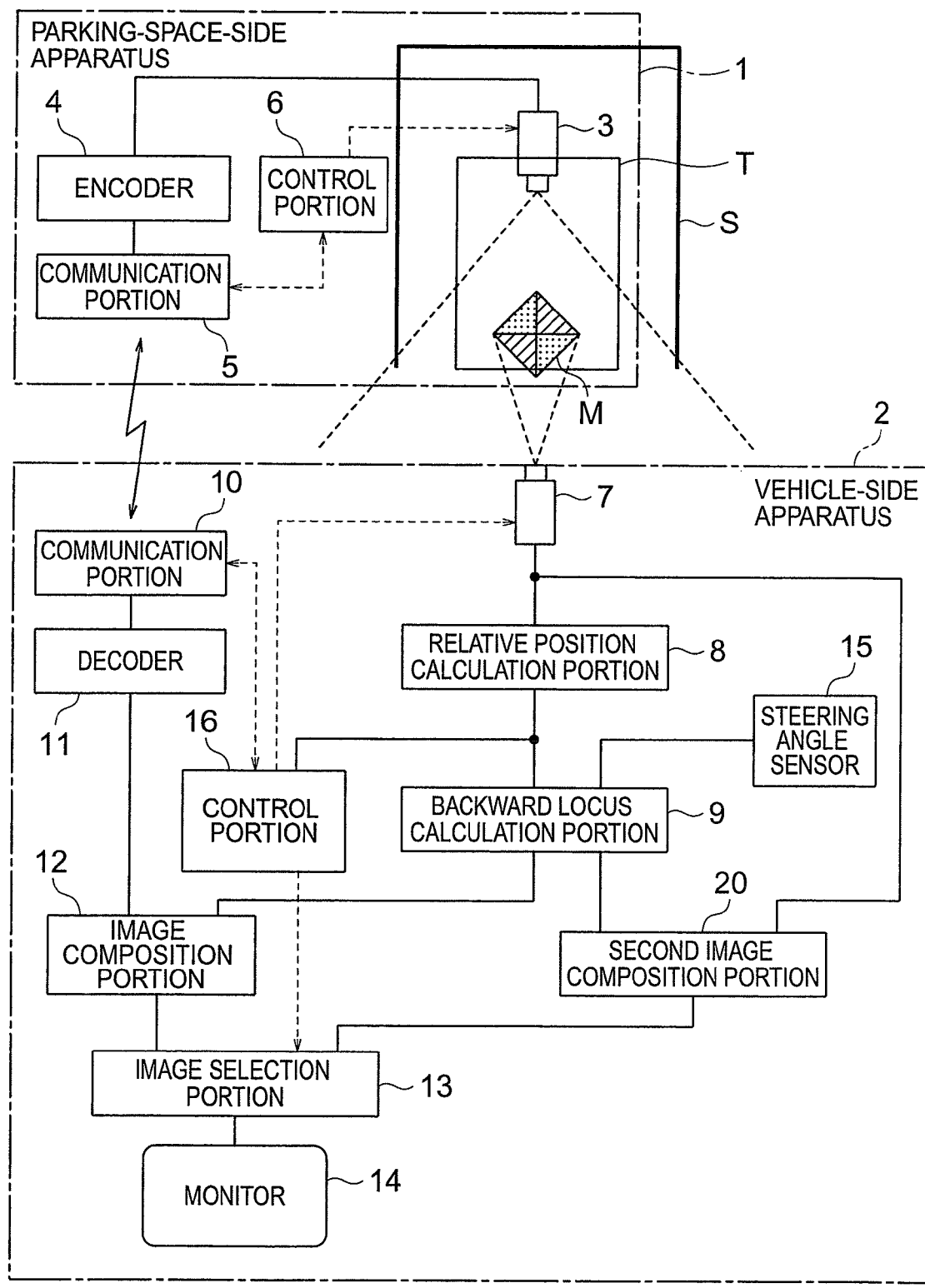
FIG. 12 is a block diagram showing a construction of a parking assistance apparatus according to a fourth embodiment.

The construction of a parking assistance apparatus related to a fourth embodiment is shown in FIG. 12. In this parking assistance apparatus, a second image composition portion 20 is connected between the vehicle-side camera 7 and the image selection portion 13 and the backward locus calculation portion 9 is connected to the second image composition portion 20 in the apparatus of the first embodiment shown in FIG. 1. The backward locus calculation portion 9 outputs drawing data of an expected backward locus with reference to a road surface to the image composition portion 12. Also, the backward locus calculation portion outputs the drawing data of the expected backward locus with reference to the vehicle V to the second image composition portion 20.

The image composition portion 12 transforms the drawing data of the expected backward locus with reference to the road surface calculated by the backward locus calculation portion 9 into drawing data in the coordinate system for an imaging screen of the parking-space-side camera 3 based on the parameters of the parking-space-side camera 3. The image composition portion 12 then composes the transformed drawing data with the image data from the parking-space-side camera 3. As a result, composed data is created in which the expected backward locus of the vehicle V is superimposed on the background image of the area around the entrance of the parking space S taken by the parking-space-side camera 3.

On the other hand, the second image composition portion 20 transforms the drawing data of the expected backward locus with reference to the vehicle V calculated by the backward locus calculation portion 9 into drawing data in the coordinate system for an imaging screen of the vehicle-side camera 7 based on the parameters of the vehicle-side camera 7. The second image composition portion 20 then composes the transformed drawing data with the image data from the vehicle-side camera 7. As a result, composed data is created in which the expected backward locus of the vehicle V is superimposed on the background image taken by the vehicle-side camera 7.

The composed data created by the image composition portion 12 and the composed data created by the second image composition portion 20 created in this manner are inputted to the image selection portion 13.

Figure 13:
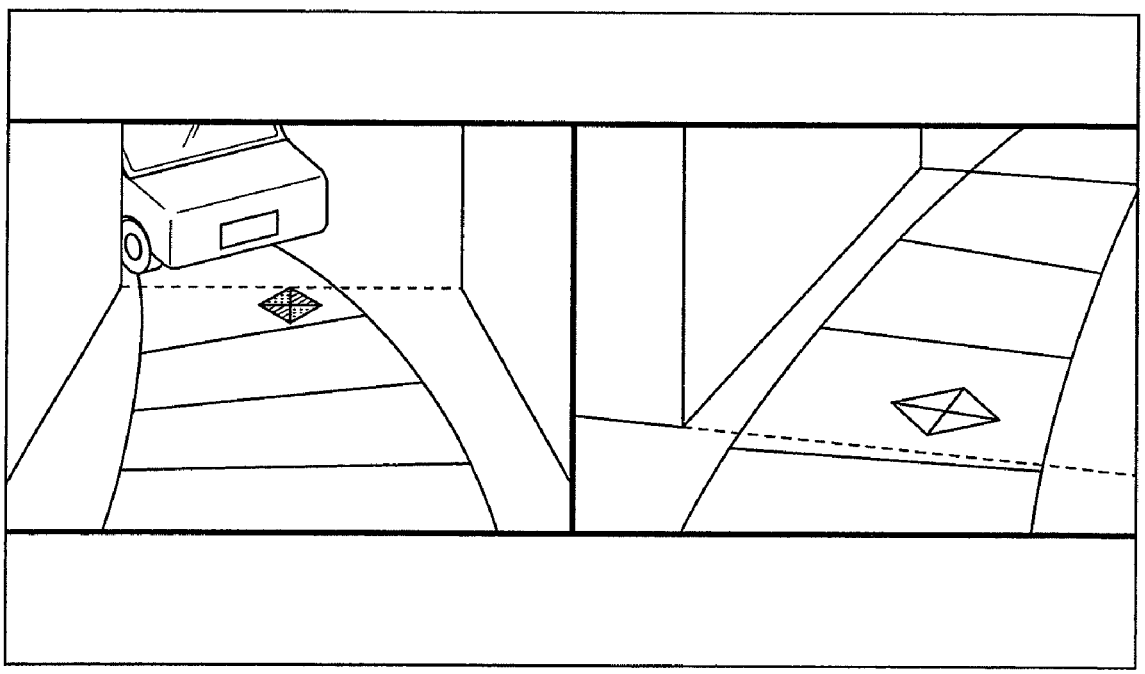
FIG. 13 shows a screen of a monitor in the fourth embodiment.

The image selection portion 13 switches between: the superimposed display of the background image for the rear view from the vehicle taken by the vehicle-side camera 7 and the expected backward locus of the vehicle V; and the superimposed display of the background image of the area around the entrance of the parking space S taken by the parking-space-side camera 3 and the expected backward locus of the vehicle V, in response to the distance L between the current position of the vehicle V and the target parking position T. Alternatively, as shown in FIG. 13, the screen of the monitor 14 may be separated into two portions, and a superimposed image of the background image for the rear view from a vehicle taken by the vehicle-side camera 7 and the expected backward locus of the vehicle V and a superimposed display of the background image of the area around the entrance of the parking space S taken by the parking-space-side camera 3 and the expected backward locus of the vehicle V may be displayed regardless of the distance L between the current position of the vehicle V and the target parking position T all the time.

It should be noted that, in the fourth embodiment as well, a perspective image on which the expected backward locus of the vehicle V is superimposed, such as shown in the second embodiment, may be displayed instead of the superimposed image of the background image of the area around the entrance of the parking space S taken by the parking-space-side camera 3 and an expected backward locus of the vehicle V.

Fifth Embodiment

Figure 14:
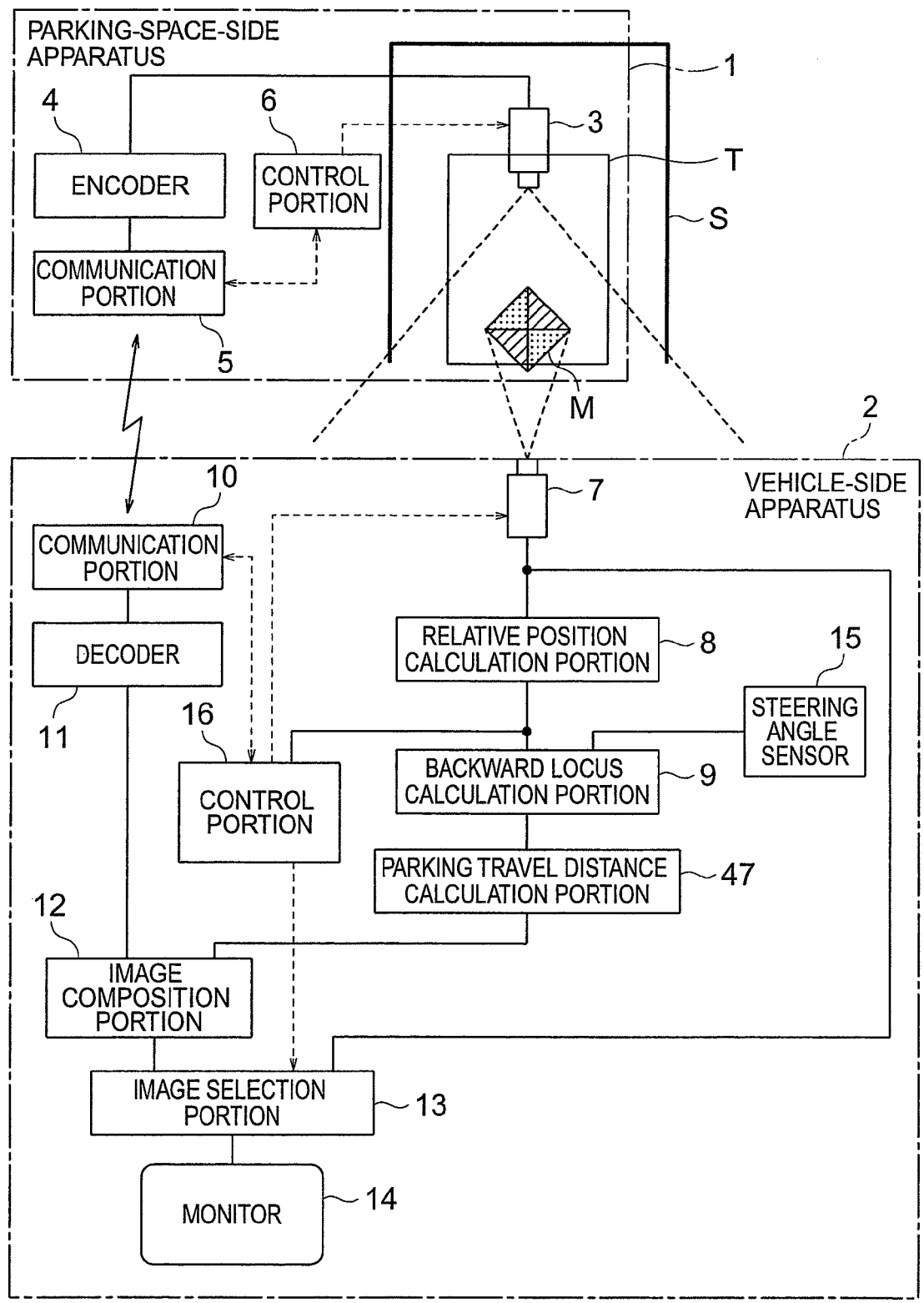
FIG. 14 is a block diagram showing a construction of a parking assistance apparatus according to a fifth embodiment.

The construction of a parking assistance apparatus related to the fifth embodiment is shown in FIG. 14. In this parking assistance apparatus, a parking travel distance calculation portion 47 is connected between the backward locus calculation portion 9 and the image composition portion 12 in the apparatus of the first embodiment shown in FIG. 1. The parking travel distance calculation portion 47 is a portion that calculates a travel distance of the vehicle V from a current position to the target parking position T based on the relative positional relation between the vehicle V and the target parking position T calculated by the relative position calculation portion 8 and based on the expected backward locus calculated by the backward locus calculation portion 9.

The image composition portion 12 creates composed data in which the travel distance of the vehicle V calculated by the parking travel distance calculation portion 47 is superimposed as information regarding parking on the background image of the area around the entrance of the parking space S taken by the parking-space-side camera 3. As a result, the background image of the area around the entrance of the parking space S taken by the parking-space-side camera 3 and the travel distance for reaching the target parking position T can be superimposed on the screen of the monitor 14.

It should be noted that the image composition portion 12 may be constructed so that the expected backward locus of the vehicle V is also displayed superimposed together with the background image of the area around the entrance of the parking space S taken by the parking-space-side camera 3 and the travel distance for reaching the target parking position T.

Sixth Embodiment

Figure 15:
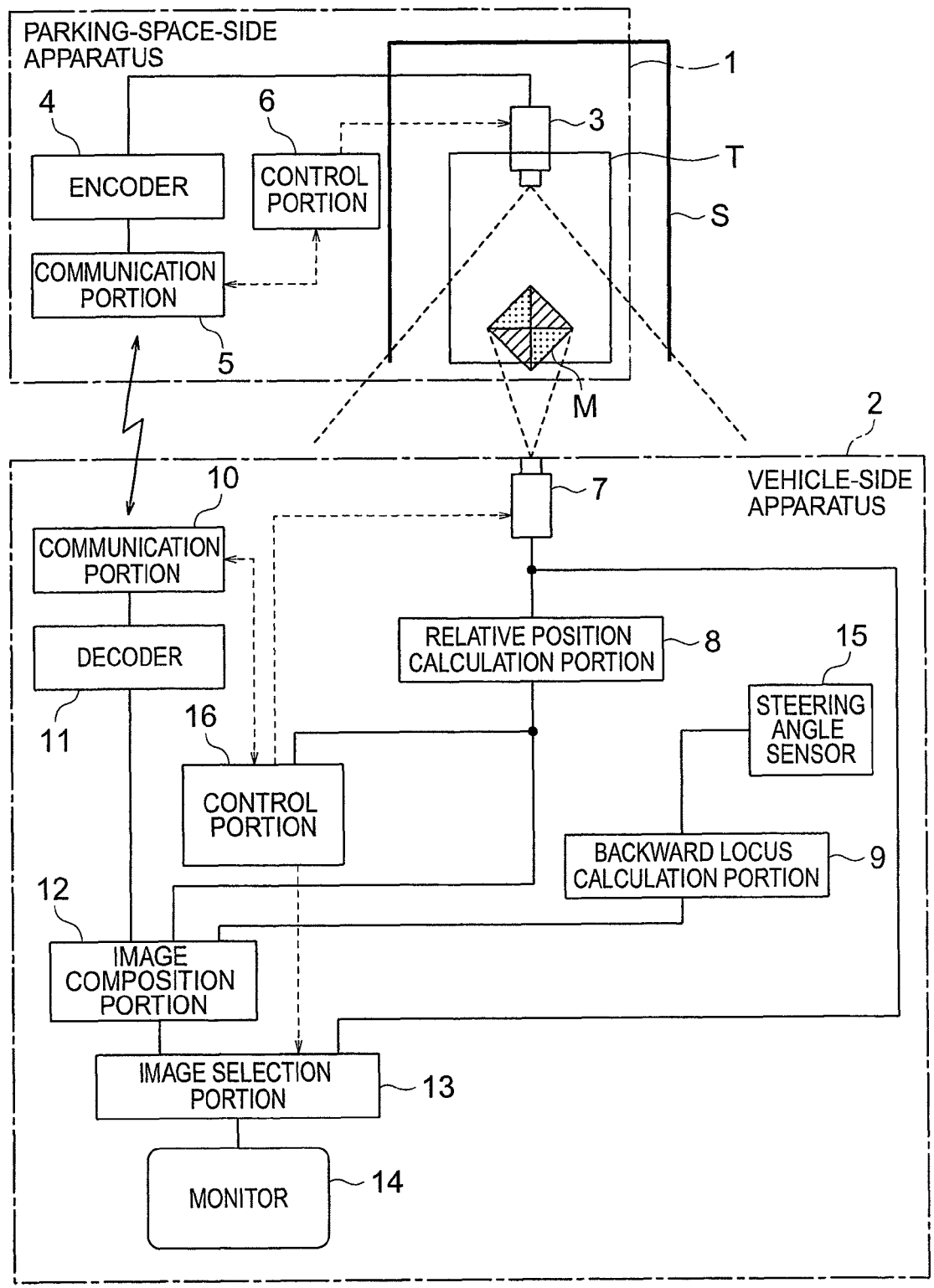
FIG. 15 is a block diagram showing a construction of a parking assistance apparatus according to a sixth embodiment.

The construction of a parking assistance apparatus related to a sixth embodiment is shown in FIG. 15. In this parking assistance apparatus, the relative position calculation portion 8 and the backward locus calculation portion 9 are connected to the image composition portion 12 in the apparatus of first embodiment shown in FIG. 1 respectively and separately instead of locating the backward locus calculation portion 9 between the relative position calculation portion 8 and the image composition portion 12.

The backward locus calculation portion 9 calculates an expected backward locus with reference to the vehicle V corresponding to a current steering angle based on the steering angle signal from the steering angle sensor 15. The image composition portion 12 transforms the drawing data of the expected backward locus with reference to the vehicle V calculated by the backward locus calculation portion 9 into drawing data in the coordinate system for the imaging screen of the parking-space-side camera 3, based on the relative positional relation between the vehicle V and the target parking position T calculated by the relative position calculation portion 8 and based on the parameters of the parking-space-side camera 3. The image composition portion 12 then composes the transformed drawing data with the image data from the parking-space-side camera 3 sent from the decoder 11. As a result, a composed data is created in which the expected backward locus of the vehicle V is superimposed on a background image of the area around the entrance of the parking space S taken by the parking-space-side camera 3.

In this manner, an operational effect similar to that of the first embodiment can also be obtained in the construction in which the relative position calculation portion 8 and the backward locus calculation portion 9 are connected to the image composition portion 12 respectively and separately.

Seventh Embodiment

Figure 16:
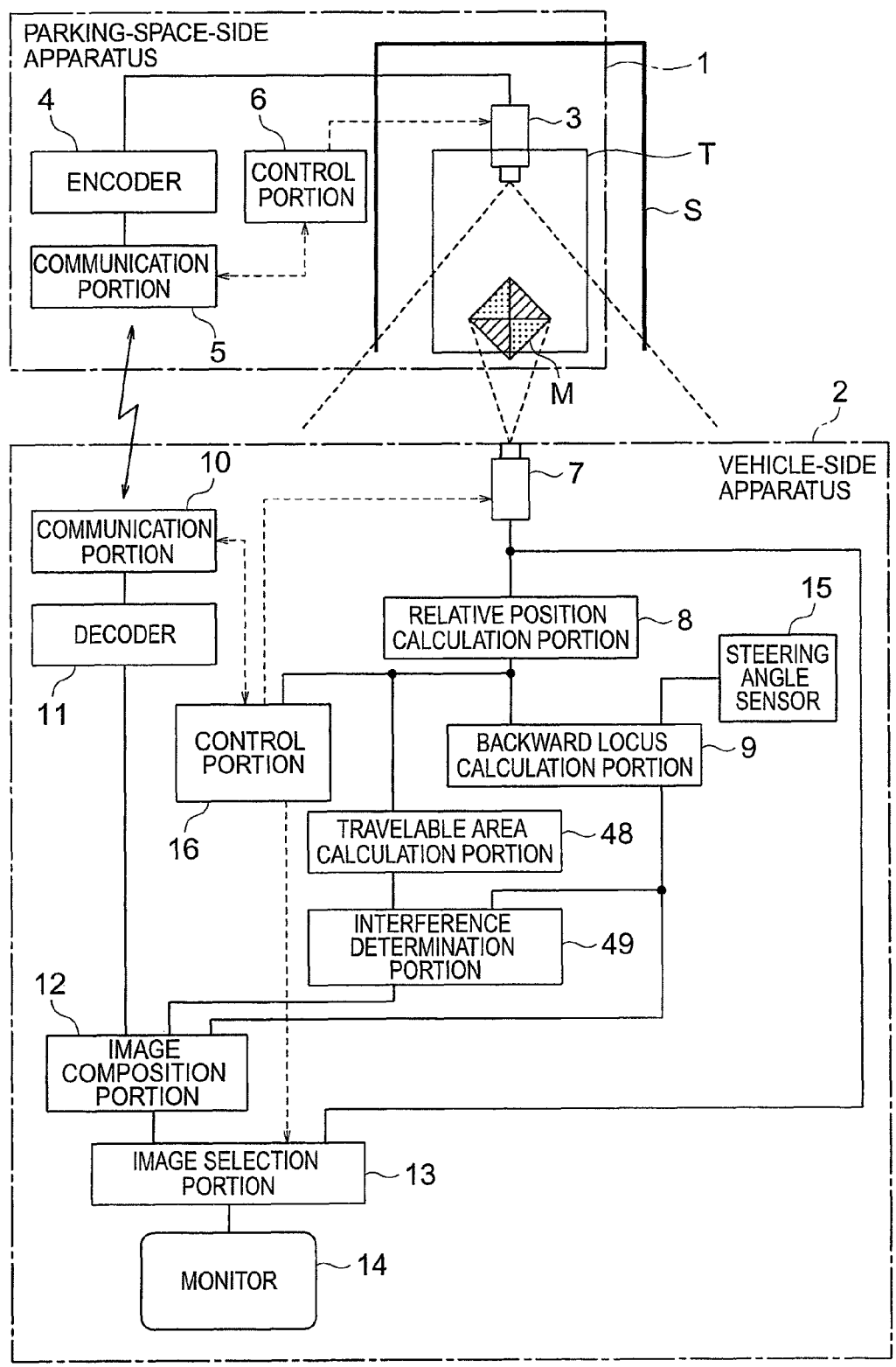
FIG. 16 is a block diagram showing a construction of a parking assistance apparatus according to a seventh embodiment.

The construction of a parking assistance apparatus related to a seventh embodiment is shown in FIG. 16. In this parking assistance apparatus, in the apparatus of the first embodiment shown in FIG. 1, a travelable area calculation portion 48 and an interference determination portion 49 are connected serially between the relative position calculation portion 8 and the image composition portion 12. The travelable area calculation portion 48 identifies an area travelable by the vehicle V based on the relative positional relation between the vehicle V and the target parking position T or the mark M calculated by the relative position calculation portion 8. Also, the interference determination portion 49 determines whether there is interference with an obstacle in the case the vehicle V travels along the expected backward locus based on the travelable area calculated by the travelable area calculation portion 48 and based on the expected backward locus calculated by the backward locus calculation portion 9.

It is assumed that the relation between the mark M and the area travelable by the vehicle V is recognized in advance. That is, by locating the mark M in response to the area in which the vehicle V can travel, it can be grasped that the vehicle V can travel in a predetermined area with reference to the mark V, and the travelable area can be calculated by recognizing the position of the mark M.

The image composition portion 12 creates composed data in which an image representing whether or not there is interference with an obstacle by characters, a mark, etc., determined by the interference determination portion 49 is superimposed as information regarding parking on the background image of the area around the entrance of the parking space S taken by the parking-space-side camera 3. As a result, the background image of the area around the entrance of the parking space S taken by the parking-space-side camera 3 and whether or not there is an interference from an obstacle are superimposed and displayed on the screen of the monitor 14.

It should be noted that the image composition portion 12 may be constructed to display the expected backward locus of the vehicle V superimposed together with the background image taken by the parking-space-side camera 3 and whether or not there is an interference.

Further, an image from the parking-space-side camera 3 received by the communication portion 10 and decoded by the decoder 11 may be inputted to the travelable area calculation portion 48, and the travelable area calculation portion 48 may calculate an area travelable by the vehicle V by also considering the image from the parking-space-side camera 3.

Eighth Embodiment

Figure 17:
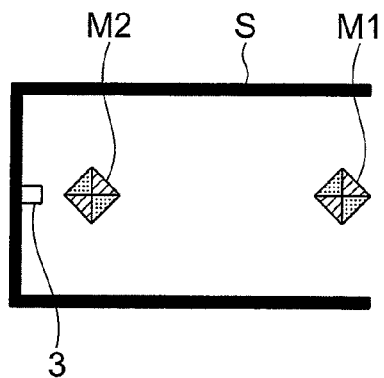
FIG. 17 is a plan view showing a parking space and a mark in a eighth embodiment.
Figure 18:
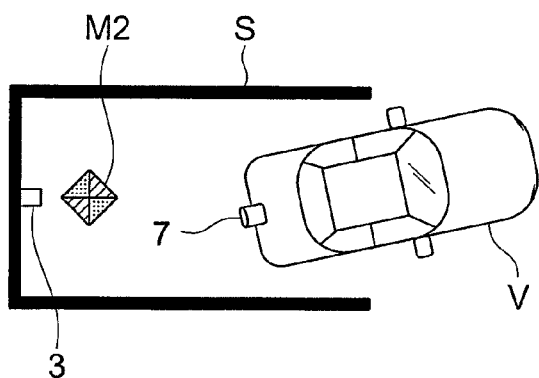
FIG. 18 is a plan view showing a relation between the parking space and the vehicle in parking operation in the eighth embodiment.

In the first embodiment described above, if the mark M is located on a floor surface near the entrance of the parking space S, the mark M can be perceived and the characteristic points can be recognized more easily because the distance between the vehicle V positioned in the vicinity of the parking space S and the mark M is shorter. However, the relative positional relation between the vehicle V and the target parking position T would become impossible to calculate as the backward parking proceeds and the mark M goes out of the field of view of the vehicle-side camera 7. Therefore, as shown in FIG. 17, marks M1 and M2 may be located on the floor surface near the entrance and on the floor at an inner side of the parking space S respectively so that either of the marks may be used. With this construction, as shown in FIG. 18, if a portion of the vehicle V enters into the parking space S and the mark M1 near the entrance of the parking space S goes out of the field of view of the vehicle-side camera 7, the relative positional relation between the vehicle V and the target parking position T can be calculated by taking an image of the mark M2 at the inner side of the parking space S by the vehicle-side camera 7.

Figure 19:
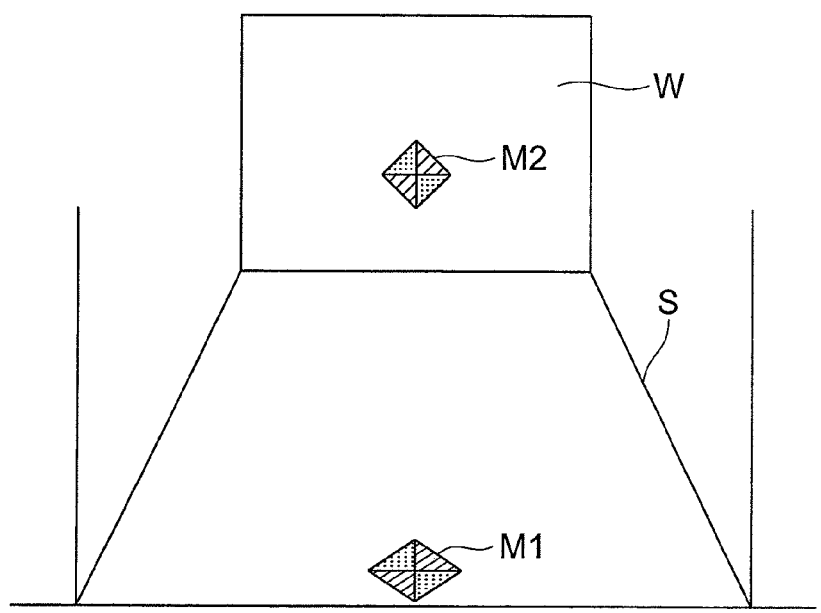
FIG. 19 shows a parking space where a mark used in an alternative example of the eighth embodiment is located.

Further, as shown in FIG. 19, the mark M2 at the inner side of the parking space S may be located at an inner side wall surface W rather than on the floor surface. With this construction, the mark M2 can be recognized by the vehicle-side camera 7 until the point that parking is completed.

It should be noted that the marks used in this invention preferably have a particular shape, color, etc., easily distinguishable from shapes present in the natural environment, so that their existence can be perceived easily in the image recognition by the image processing means 17 and the characteristic points included therein can be easily recognized.

Also, it is preferable that the marks have a sufficient size and are located at places where they can be easily perceived from the vehicle V so that the accuracy of the relative positional relation between the vehicle V and the marks calculated based on the two-dimensional coordinates of the recognized characteristic points and the accuracy of the parking locus calculated based on the relative positional relation can achieve an aimed parking accuracy.

Concretely, a mark may be located by painting it directly at a predetermined location on a floor surface, a wall surface, etc., of the parking space S. Alternatively, a mark may be located by attaching a sheet on which a mark is drawn to a predetermined position.

Ninth Embodiment

In the first to eighth embodiments described above, the figure having an external form in a square shape in which four isosceles right-angled triangles are abutted against each other is used as the marks M, M1 and M2 of the parking space S. However, the marks are not limited to this and various marks, for example those shown in FIG. 20, may be used.

Figure 20A:
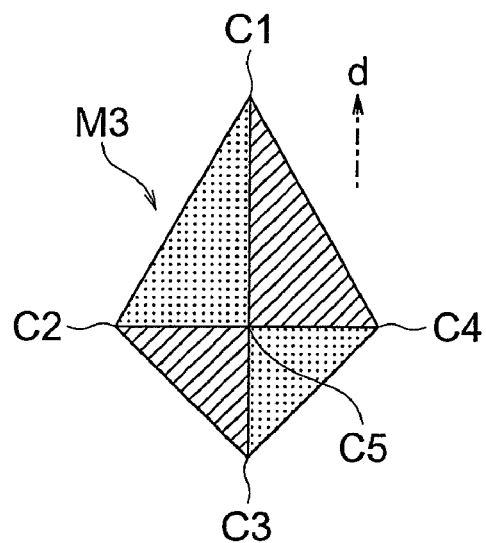
FIG. 20 shows a mark used in a ninth embodiment.

A mark M3 shown in FIG. 20A has a shape in which two triangles of the mark M shown in FIG. 3 are elongated in a predetermined direction d. The mark M3 comprises five characteristic points C1 to C5. If the mark M3 is located on the floor of the parking space S with the direction d directed toward the entrance of the parking space S, an image of a generally square shape can be obtained in a perspective image when the vehicle-side camera 7 takes an image of the mark M3 located obliquely downward at a point in the vicinity of the parking space S. As a result, extraction of the five characteristic points C1 to C5 from the image of the mark M3 becomes easier.

Figure 20B:
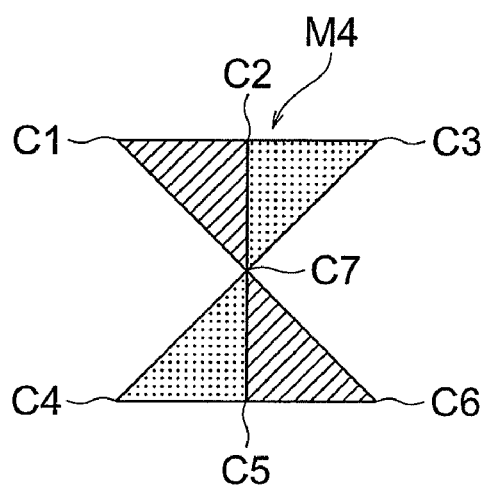

A mark M4 shown in FIG. 20B exchanges positions of the top two triangles and the bottom two triangles in the mark M shown in FIG. 3. The mark M4 comprises seven characteristic points C1 to C7.

Figure 20C:
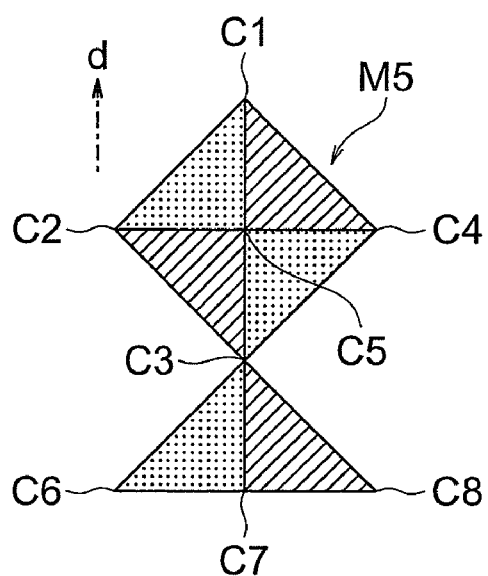

A mark M5 shown in FIG. 20C adds two triangles further to the mark M shown in FIG. 3 and comprises eight characteristic points C1 to C8.

These marks M3 to M5 may be used in a manner similar to the mark M shown in FIG. 3.

Tenth Embodiment

Figure 21:
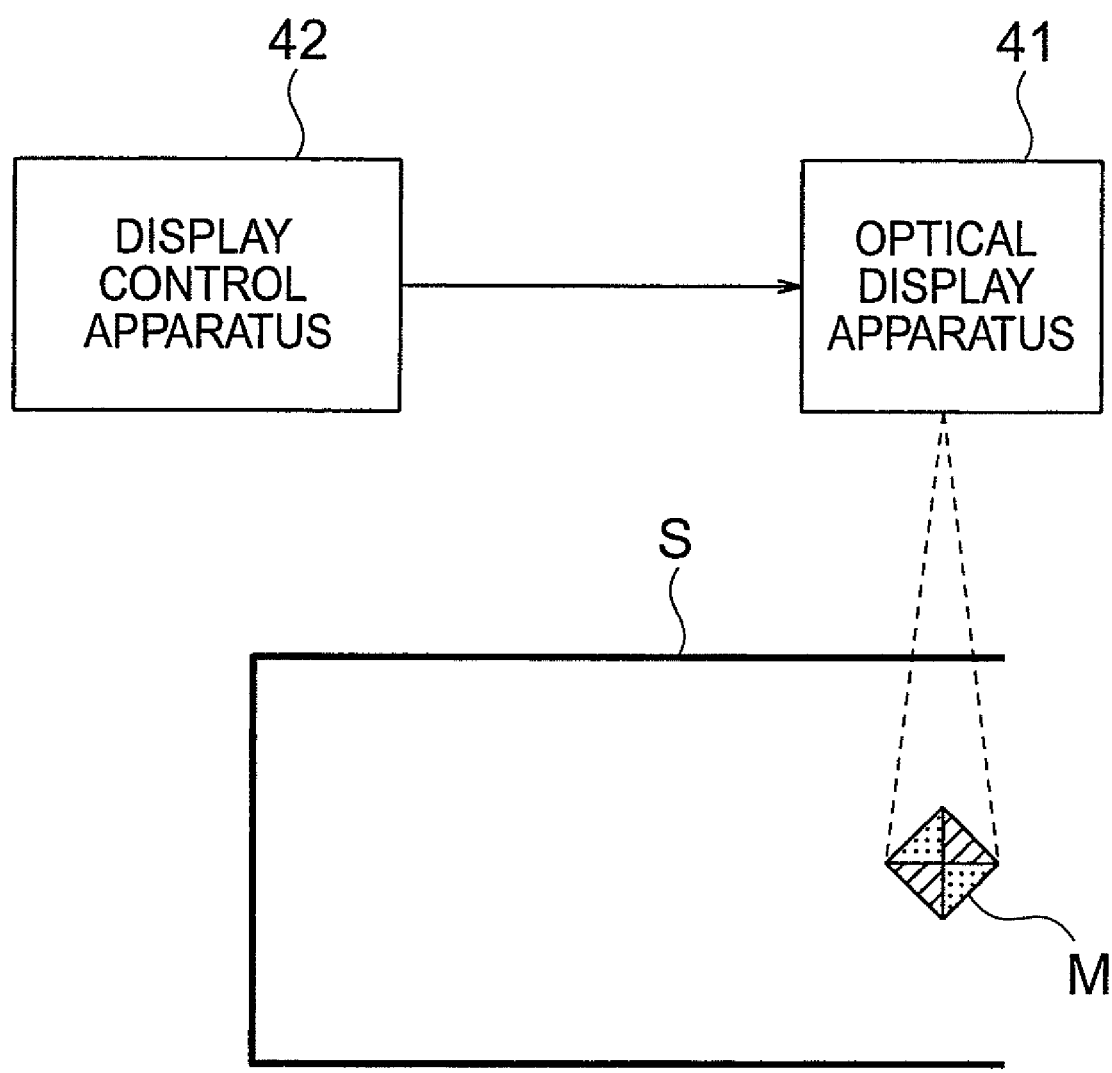
FIG. 21 is a block diagram showing a construction of an apparatus for displaying a mark in a tenth embodiment.

In the first to ninth embodiments described above, the mark used as a fixed target may be displayed by means of light. For example, as shown in FIG. 21, a display control apparatus 42 is connected to an optical display apparatus 41 for displaying the mark M utilizing light, and the mark M is displayed at a predetermined location by the optical display apparatus 41 based on a command from the display control apparatus 42.

Figure 22:
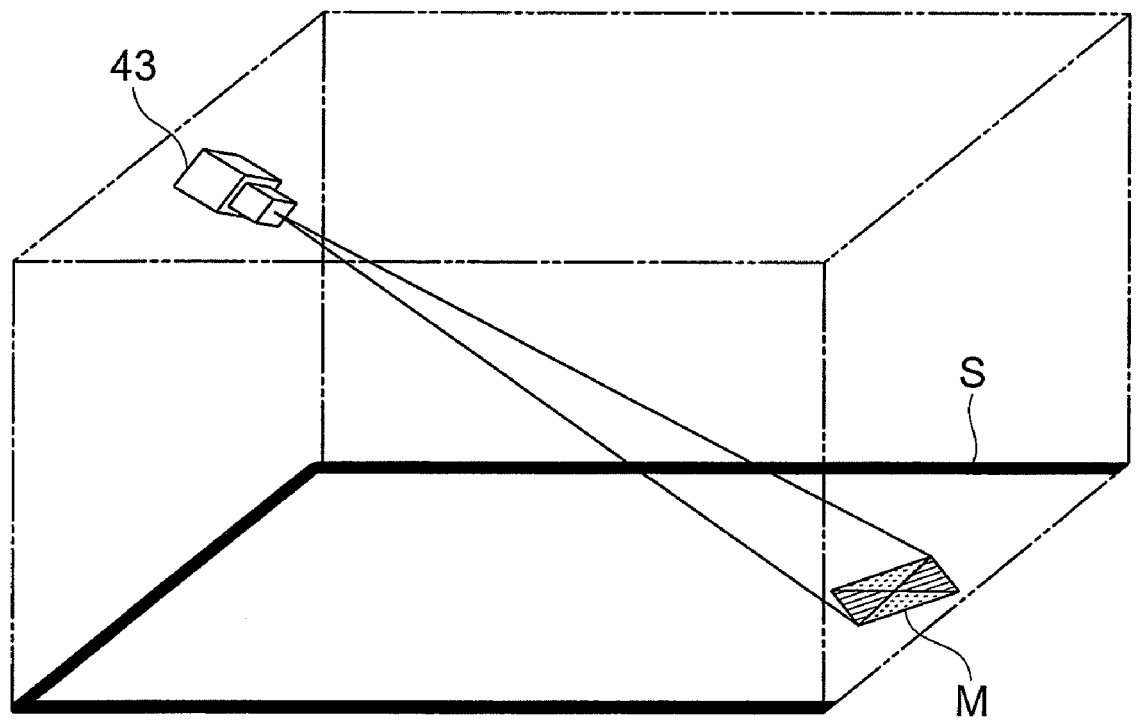
FIG. 22 is a perspective view showing how a mark is displayed using a projector.
Figure 23:
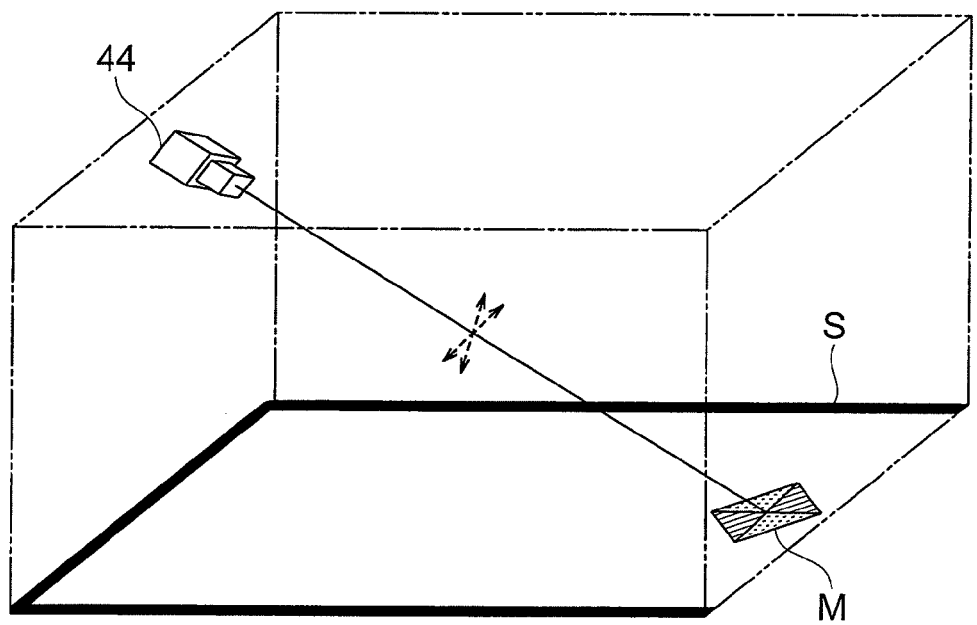
FIG. 23 is a perspective view showing how a mark is displayed using a laser scanner.
Figure 24:
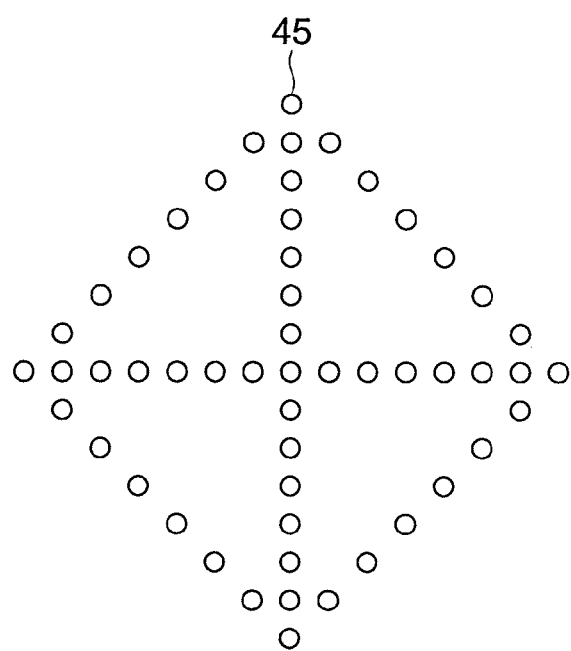
FIG. 24 is a plan view showing how a mark is displayed using multiple illuminators.
Figure 25:
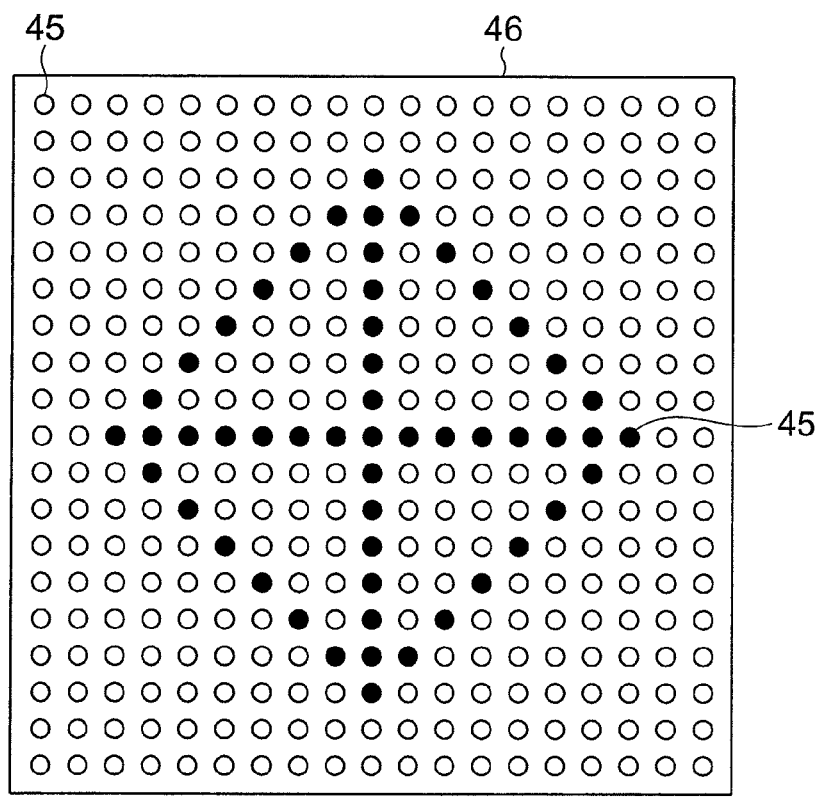
FIG. 25 is a plan view showing how a mark is displayed using an illumination device in a form such as an electric billboard.

For example, as shown in FIG. 22, the mark M may be displayed by projection using a projector 43 as the optical display apparatus 41. Alternatively, as shown in FIG. 23, the mark M may be displayed by scanning a laser beam using a laser scanner 44 as the optical display apparatus 41. Further, as shown in FIG. 24, the mark M may be displayed by arranging and fixing multiple illuminators 45 such as LEDs along the shape of the mark M at a predetermined location and making the multiple illuminators 45 illuminate by the display control apparatus 42. Also, as shown in FIG. 25, an illumination apparatus 46 in a form like a so-called electric billboard in which multiple illuminators 45 such as LEDs are filled in a predetermined area may be located in advance, and the mark M may be displayed by making illuminators 45 within the illumination apparatus 46 illuminate selectively by the display control apparatus 42. In FIG. 25, only the illuminators 45 painted in black illuminate and the other illuminators 45 are in a non-illuminating condition.

If the mark M is displayed utilizing light as done in the tenth embodiment, there is less risk that the shape of the mark will be damaged by blurring or wearing out of the surface where the mark is located compared with the case in which a mark is displayed by painting or a sheet. Also, the relative positional relation between the vehicle V and the mark M can be detected with accuracy even after the mark M is used for a long period.

Also, controlling the optical display apparatus 41 by the display control apparatus 42 makes modification of the display brightness of the mark M easier. As a result, by adjusting the brightness in conformity with the brightness of the surrounding environment, e.g. in the morning or at nighttime, an easily recognizable mark M can be displayed all the time.

In the case where the projector 43 or the laser scanner 44 is used as the optical display apparatus 41, the size of the displayed mark M can be changed easily by controlling the optical display apparatus 41 by the display control apparatus 42. As a result, the accuracy of recognizing the characteristic points of the mark M can be improved by displaying a large mark M when the vehicle V is distant from the mark M and displaying a small mark M after the vehicle V approaches the mark M. It should be noted that, in this case, information regarding the size of the mark M has to be communicated to the vehicle-side apparatus 2.

In a similar manner, when the projector 43 or the laser scanner 44 is used as the optical display apparatus 41, the position of the displayed mark M can be changed easily by controlling the optical display apparatus 41 by the display control apparatus 42. As a result, the position of the mark M can be changed easily when it is desired to adjust the target parking position in response to the presence of an obstacle or the like in the parking space S so that the vehicle V can be parked at a desired position.

Further, instead of locating a plurality of marks on the floor surface near the entrance of the parking space S and on the floor surface at the inner side as shown in FIG. 17, the position of the displayed mark M may be moved in response to the position of the vehicle V. This saves labor and cost for locating a plurality of marks.

It should be noted that, also when the position of the mark M is changed in this manner, information regarding the position of the mark M must also be communicated to the vehicle-side apparatus 2.

Also, in the case that the illumination apparatus 46 in a form such as an electric billboard shown in FIG. 25 is used as the optical display apparatus 41, the size or position of the mark M described above can be changed within the area filled by the illuminators 45.

If a projector 43 or laser scanner 44 is used, the color in which the mark M is displayed can be changed easily. As a result, by adjusting the display color in conformity with a change of the surrounding environment, an easily recognizable mark M can be displayed all the time.

Also, if a projector 43 or laser scanner 44 is used, the mark M may be displayed on a flat surface like a screen located on a floor surface, a side wall surface, etc., of the parking space S. With this construction, the mark M can be displayed without having its shape damaged even if the floor surface, the side wall surface, etc. are bumpy and the recognition accuracy of the characteristic points of the mark M can be improved. It should be noted that the flat surface like a screen can be realized by selecting a material or a shape suitable for the location where it is provided, e.g. by sticking a flexible screen on a surface where it is located or by providing a flat member.

The intensity, wavelength (a color), etc., of the displaying light of the mark M can be modulated by controlling the optical display apparatus 41 by the display control apparatus 42, and the image of the mark M taken by the camera of the vehicle V can be demodulated. With this construction, influence from noise from sunlight, lighting, etc., can be excluded and the positions of the characteristic points of the mark M can be recognized with high accuracy. Also, by the modulation of the displaying light of the mark M, not only the characteristic points of the mark M but also various information, such as information regarding the parking space S itself and/or information regarding a method for parking into the parking space S, can be superimposed. For example, information indicating that the mark M is a passing point toward the target parking position or information indicating that the mark M is a parking completion position can be superimposed while changing the position where the mark M is displayed in response to the position of the vehicle V.

The displaying light of the mark M may be anything recognizable by the camera of the vehicle V. Non-visible light such as infrared or ultraviolet may be used. The light may be a displaying light with high speed modulation which cannot be recognized visually. Further, a so-called imprinting of the mark M may be performed by displaying the mark M within a very short duration which cannot be recognized visually in an image which can be recognized visually. By recognizing the mark M thus imprinted by the camera of the vehicle V, the relative positional relation between the vehicle V and the mark M can be detected. In a similar manner, the various information described above may be imprinted in an image or in the mark M.

Eleventh Embodiment

Figure 26:
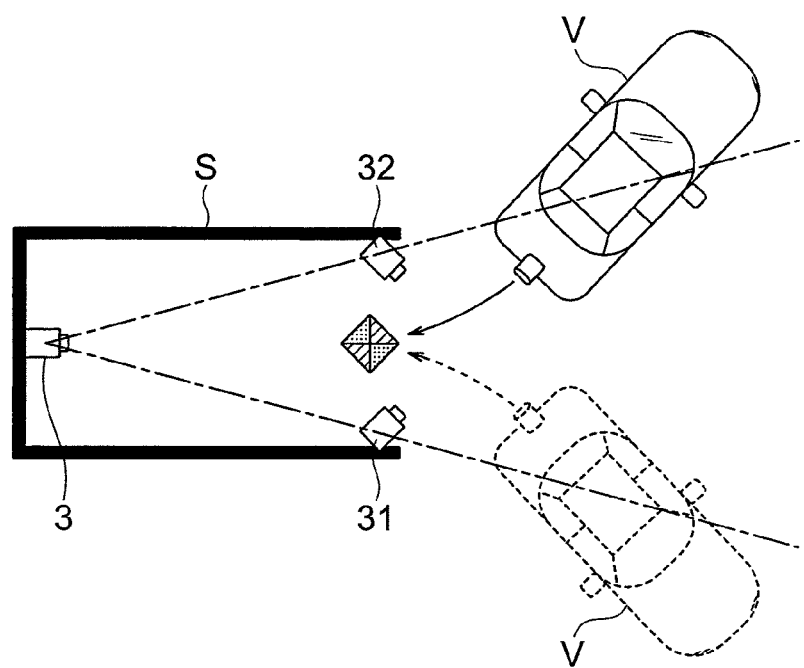
FIG. 26 is a plan view showing a parking space where a parking-space-side camera used in an eleventh embodiment is located.

In the first to tenth embodiments described above, a single parking-space-side camera 3 located at the inner side of the parking space S captures the image of the area around the entrance of the parking space S. However, a plurality of parking-space-side cameras may be located to take respective images in the vicinity of the parking space S. For example, as shown in FIG. 26, a parking-space-camera for left side parking 31 and a parking-space-camera for right side parking 32 may be located at respective sides near the entrance of the parking space S in addition to the parking-space-side camera 3 located at the inner side of the parking space S. One parking-space-side camera 31 may take an image of the vehicle V when left side parking is performed as indicated by the vehicle V shown by continuous lines while the other parking-space-side camera 32 may take an image of the vehicle V when right side parking is performed as indicated by the vehicle V shown by broken lines.

Upon this, the control portion 16 of the vehicle-side apparatus 2 may switch between the parking-space-side camera 31, or the parking-space-side camera 32, near the entrance of the parking space S and the parking-space-side camera 3 at the inner side of the parking space S by commanding the parking-space-side apparatus 1 via the communication portion 10 based on the relative positional relation between the vehicle V and the target parking position T calculated by the relative position calculation portion 8.

That is, when the distance between the vehicle V and the target parking position T is large and the vehicle V does not yet enter in the field of view of the parking-space-side camera 3 at the inner side of the parking space S, the control portion 16 of the vehicle-side apparatus 2 receives the image data from the parking-space-side camera 31 or 32 by commanding the parking-space-apparatus 1 via the communication portion 10. Then the control portion 16 of the vehicle-side apparatus 2 has the image composition portion 12 receive the image data to be composed with the drawing data of the expected backward locus calculated by the backward locus calculation portion 9.

Then, when the distance between the vehicle V and the target parking position T gets smaller and the vehicle enters into the field of view of the parking-space-side camera 3 at the inner side of the parking space S, the control portion 16 of the vehicle-side apparatus 2 receives the image data from the parking-space-side camera 3 by commanding the parking-space-apparatus 1 via the communication portion 10. Then the control portion 16 of the vehicle-side apparatus 2 has the image composition portion 12 receive the image data to be composed with the drawing data of the expected backward locus calculated by the backward locus calculation portion 9.

With this construction, a driver can proceed with the parking operation viewing a background image fixed with respect to the screen of the monitor 14 regardless of movement of the vehicle V from an initial stage of parking where the vehicle V is still distant from the parking space S.

In the eleventh embodiment, the expected backward locus of the vehicle V is superimposed on an image in the vicinity of the parking space S taken by any of the plurality of the parking-space-side cameras. However, a perspective image may be created by composing the image from the vehicle-side camera 7 and the image from a parking-space-side camera and the expected backward locus of the vehicle V may be displayed on the screen of the monitor 14 superimposed on the perspective image, as done in the second embodiment. In this case, the perspective image may be created based on images from each of the plurality of parking-space-side cameras and the image from the vehicle-side camera 7. Alternatively, the perspective image may be created based on a selected one of the plurality of the parking-space-side cameras and the image from the vehicle-side camera 7.

Twelfth Embodiment

Figure 27:
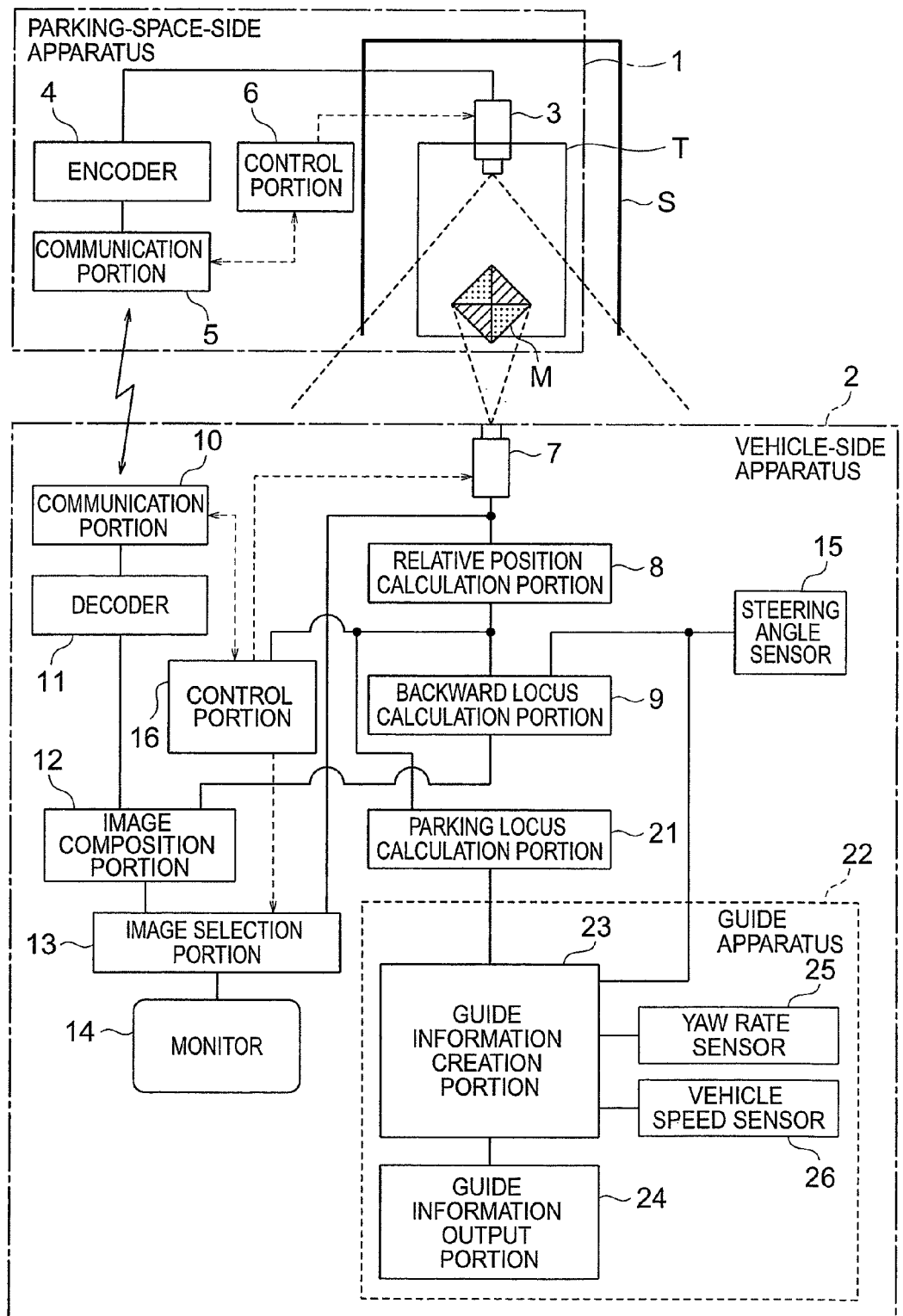
FIG. 27 is a block diagram showing a construction of a parking assistance apparatus according to a twelfth embodiment.

The construction of a parking assistance apparatus related to the twelfth embodiment is shown in FIG. 27. In this parking assistance apparatus, a parking locus calculation portion 21 is connected to the relative position calculation portion 8 and a guide apparatus 22 is connected to the parking locus calculation portion 21 in the apparatus of the first embodiment shown in FIG. 1.

The parking locus calculation portion 21 calculates a parking locus for leading the vehicle V to the target parking position T based on the relative positional relation between the vehicle V and the target parking position T calculated by the relative position calculation portion 8. The guide apparatus 22 outputs drive operation guide information to the driver of the vehicle V.

The guide apparatus 22 consists of a guide information creation portion 23, a guide information output portion 24, a yaw rate sensor 25 connected to the guide information creation portion 23 and a vehicle speed sensor 26.

The guide information creation portion 23 creates drive operation guide information for moving the vehicle V along a parking locus based on detection signals from the steering angle sensor 15, the yaw rate sensor 25 and the vehicle speed sensor 26 and based on the parking locus calculated by the parking locus calculation portion 21.

The guide information output portion 24 outputs the guide information created by the guide information creation portion 23. This may be constituted by a speaker or a buzzer which communicates the guide information via the auditory senses of the driver by voice, alarm, etc. Other than this, a display or a lamp which communicates the guide information visually by images, illumination, etc., may be used as the guide information output portion 24. Further, a vibrator or the like which communicates the guide information tactually by vibration or the like may also be used as the guide information output portion 24.

The guide information creation portion 23 takes the steering angle signal from the steering angle sensor 15, a yaw rate signal from the yaw rate sensor 25 and a vehicle speed pulse signal from the vehicle speed sensor 26 repeatedly as the vehicle travels. The guide information creation portion 23 calculates a turn radius, a turn angle and a moving distance of the vehicle V based on those signals. As a result, the difference of position from the relative position of the vehicle V with respect to the target portion T calculated by the relative position calculation portion 8 is calculated and the current position and the current advancing direction of the vehicle V are identified. The guide information creation portion 23 creates the drive operation guide information for moving the vehicle V along the parking locus by comparing the position and the advancing direction of the vehicle V identified in this manner and the parking locus calculated by the parking locus calculation portion 21.

It should be noted that vehicle travel parameters, such as the turn radius of the vehicle V with respect to steering angle, a gain of the yaw rate sensor 25 and the moving distance per vehicle speed pulse, are set in the guide information creation portion 23 in advance. The turn radius, the turn angle and the moving distance of the vehicle V are calculated using the steering angle signal, the yaw rate signal, the vehicle speed pulse signal and those vehicle travel parameters.

The drive operation guide information created in this manner is outputted from the guide information output portion 24 to the driver of the vehicle V. As a result, the driver can move the vehicle V along the parking locus and park it at the target parking position T in the parking space S merely by driving in accordance with the guide information.

Thirteenth Embodiment

Figure 28:
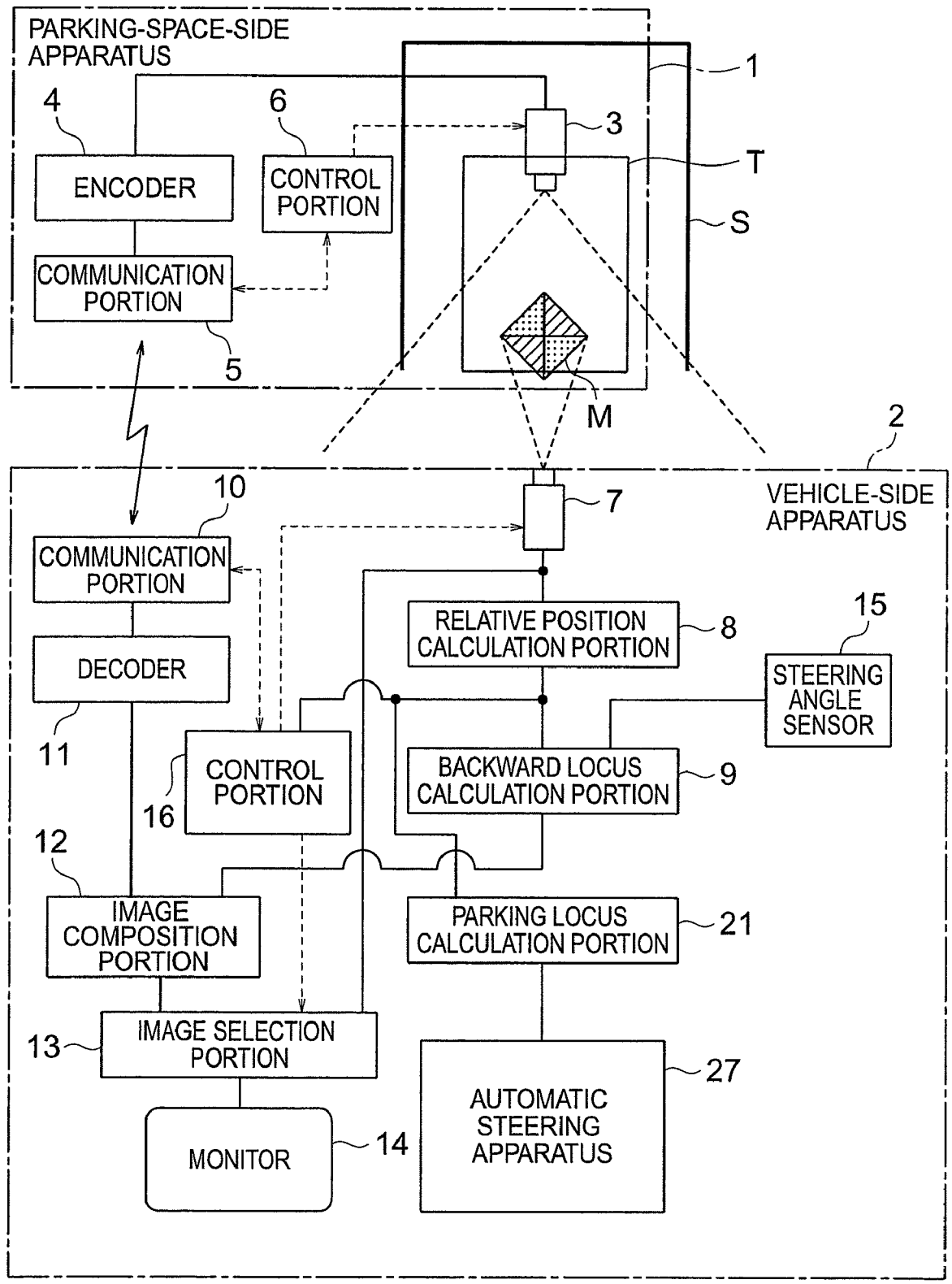
FIG. 28 is a block diagram showing a construction of a parking assistance apparatus according to a thirteenth embodiment.

The construction of a parking assistance apparatus related to the thirteenth embodiment is shown in FIG. 28. In this thirteenth embodiment, an automatic steering apparatus 27 is connected to the parking locus calculation portion 21 in the apparatus of the twelfth embodiment shown in FIG. 27 instead of the guide apparatus 22. The automatic steering apparatus 27 is an apparatus that creates a steering signal so that a steering wheel is automatically moved in accordance with movement of the vehicle V from brake operation and acceleration operation by the driver and sends the steering signal out to an electric power steering apparatus (EPS).

Figure 29:
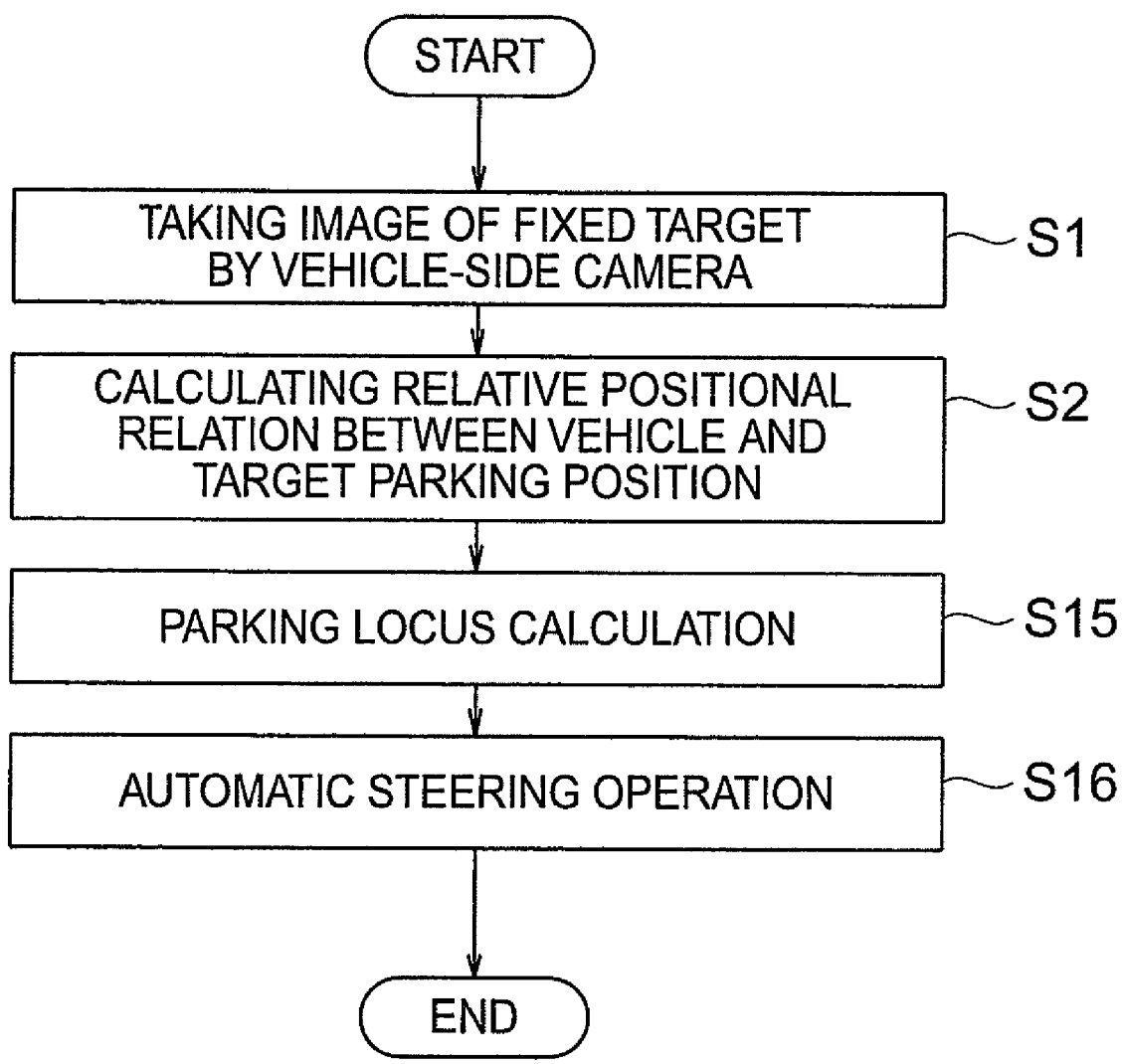
FIG. 29 is a flowchart showing an operation of the thirteenth embodiment.

The operation of the eleventh embodiment is shown in a flowchart in FIG. 29. After a relative positional relation between the vehicle V and the target parking position T is calculated by the relative position calculation portion 8 in Step S2, a parking locus L is calculated by the parking locus calculation means 5 in subsequent Step S15, and steering for moving the vehicle V along the parking locus is automatically performed by the automatic steering apparatus 27 in Step S16. As a result, the driver can perform parking into the target parking position T of the parking space S merely by performing braking and acceleration operations while paying attention to obstacles or the like on the periphery of the vehicle V.

Fourteenth Embodiment

Figure 30:
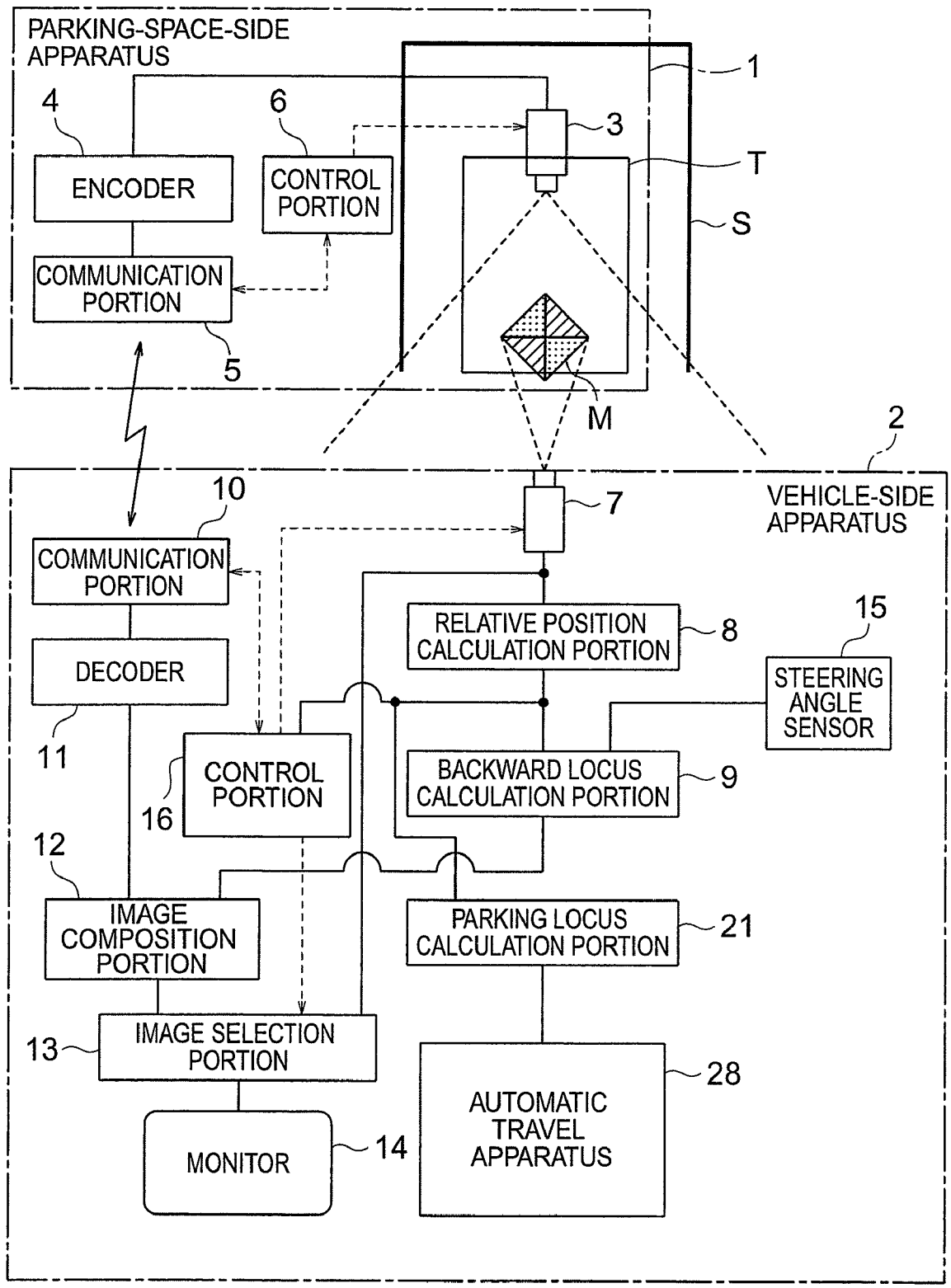
FIG. 30 is a block diagram showing a construction of a parking assistance apparatus according to a fourteenth embodiment.

The construction of a parking assistance apparatus related to the fourteenth embodiment is shown in FIG. 30. In this fourteenth embodiment, an automatic travel apparatus 28 is connected to the parking locus calculation portion 21 in the apparatus of the twelfth embodiment shown in FIG. 27 instead of the guide apparatus 22. The automatic travel apparatus 28 is an apparatus that causes the vehicle V to automatically travel by outputting travel signals such as brake control signals, acceleration control signals and shift control signals in addition to steering signals for moving the steering wheel.

Figure 31:
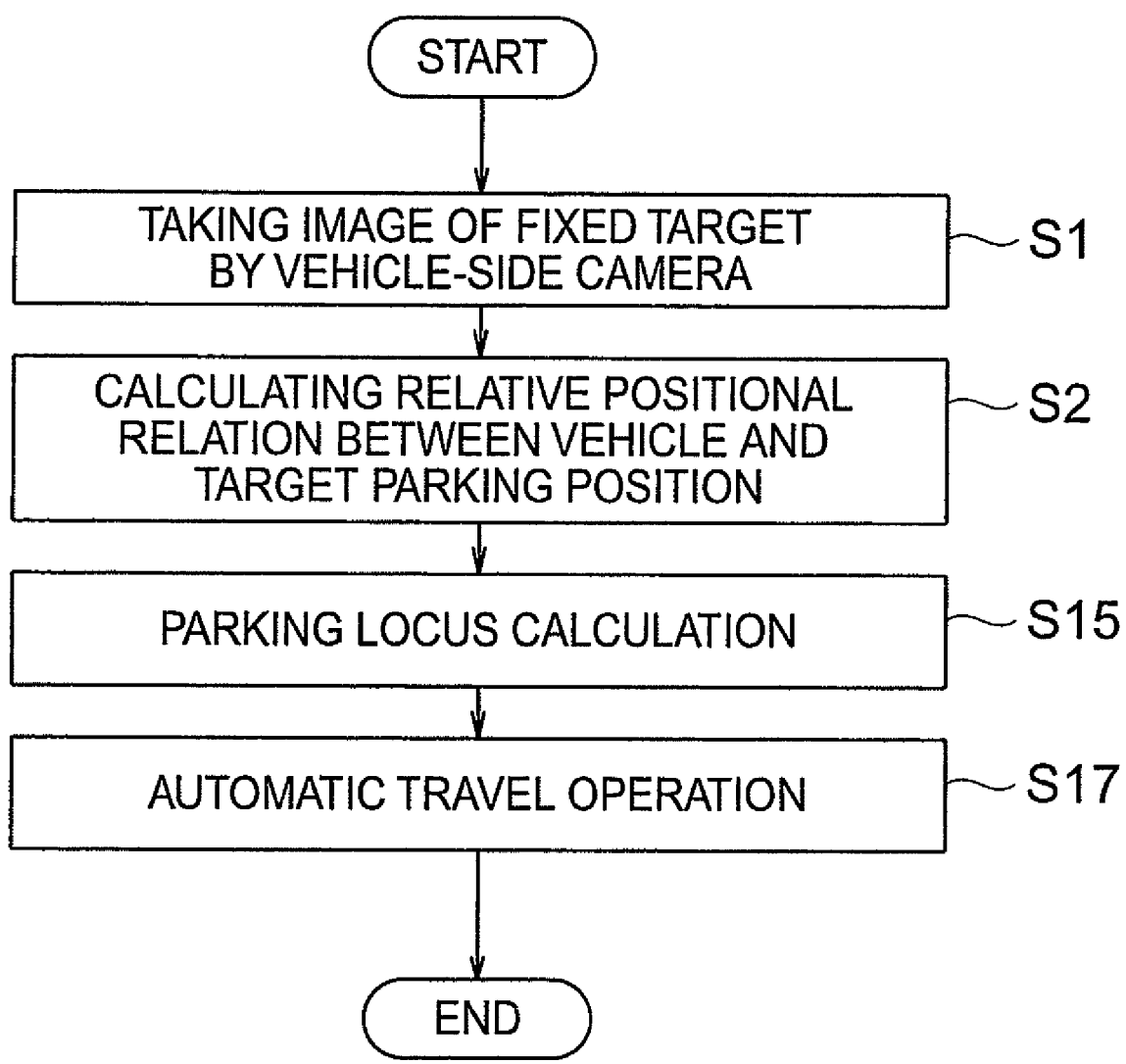
FIG. 31 is a flowchart showing an operation of the fourteenth embodiment.

The operation of the twelfth embodiment is shown in a flowchart in FIG. 31. After a relative positional relation between the vehicle V and the target parking position T is calculated by the relative position calculation portion 8 in Step S2, a parking locus L is calculated by the parking locus calculation portion 5 in subsequent Step S15, and the vehicle V is automatically moved along the parking locus by the automatic travel apparatus 28 in Step S17. As a result, the driver can perform automatic parking into the target parking position T of the parking space S merely by paying attention to obstacles or the like on the periphery of the vehicle V without performing any drive operations for parking.

Fifteenth Embodiment

Figure 32:
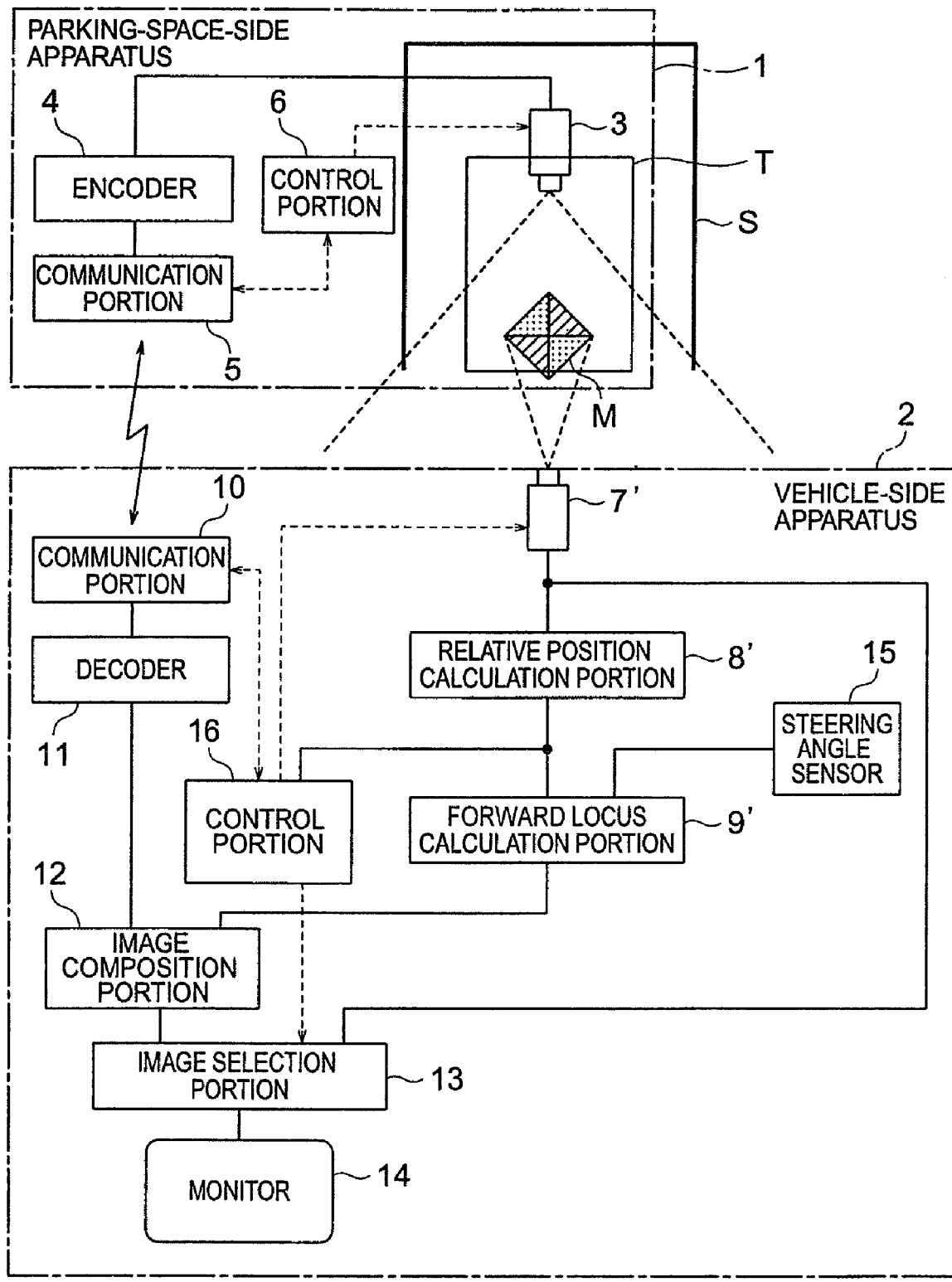
FIG. 32 is a block diagram showing a construction of a parking assistance apparatus according to a fifteenth embodiment.

The construction of a parking assistance apparatus related to the fifteenth embodiment is shown in FIG. 32. This fifteenth embodiment is constructed for assisting parking by forward movement of the vehicle instead of parking by backward movement of the vehicle in the apparatus of the first embodiment shown in FIG. 1.

That is, the vehicle-side apparatus 2 has a vehicle-side camera 7' mounted on a front portion of the vehicle for taking an image of a front view from the vehicle instead of the vehicle-side camera 7 for taking an image of a rear view from the vehicle. An image of the mark M in the parking space S is taken by the vehicle-side camera 7' when forward parking into the parking space S is performed. Also, the vehicle-side apparatus 2 has a relative position calculation portion 8' instead of the relative position calculation portion 8 and has a forward locus calculation portion 9' instead of the backward locus calculation portion 9. The forward locus calculation portion 9' functions as the expected locus calculation portion in the fifteenth embodiment.

Figure 33:
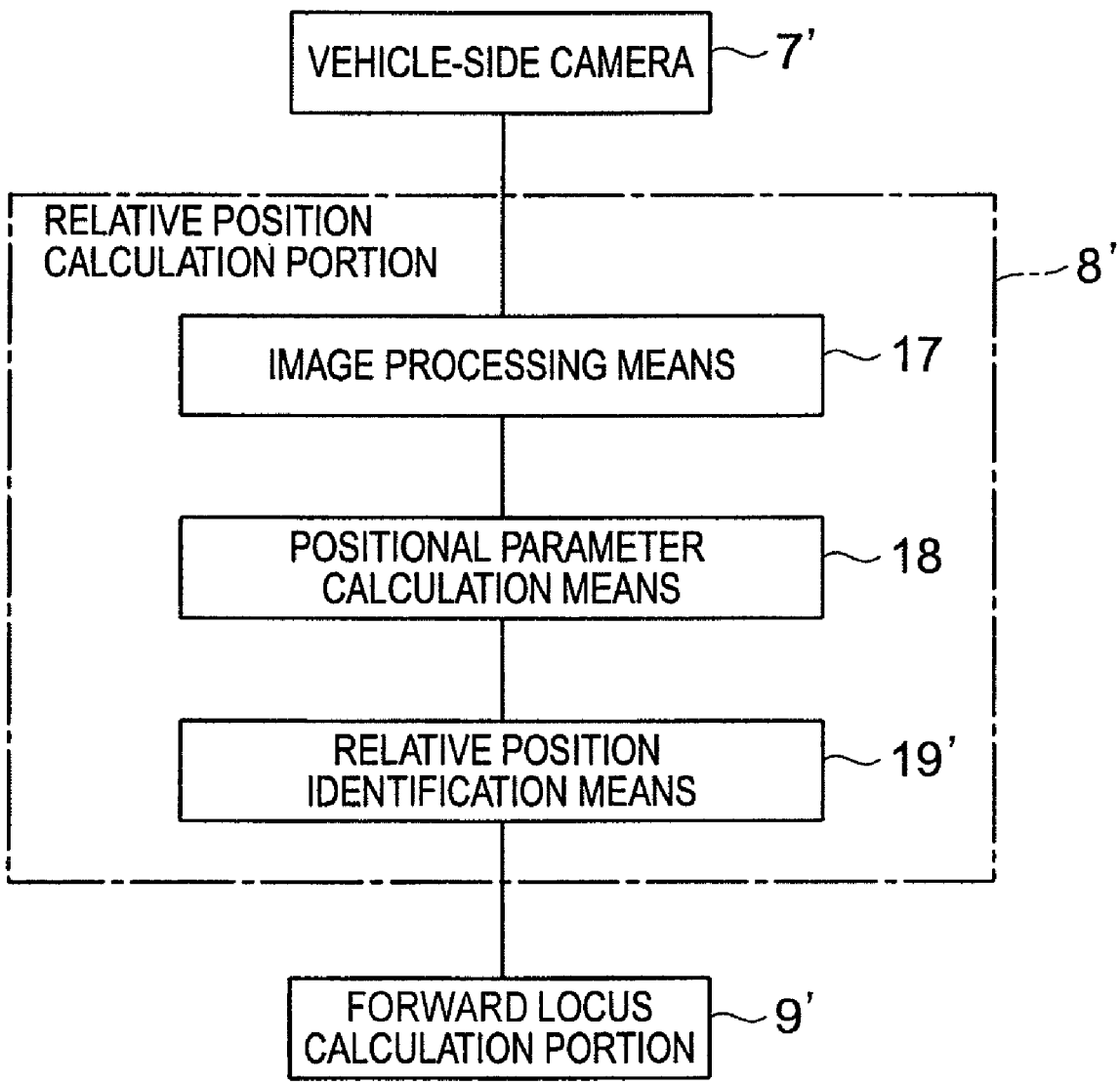
FIG. 33 is a block diagram showing a construction of a relative position calculation portion in the fifteenth embodiment.

As shown in FIG. 33, the relative position calculation portion 8' of the vehicle-side apparatus 2 in the fifteenth embodiment has a relative position identification means 19' instead of the relative position identification means 19 in the relative position calculation portion 8 of the first embodiment shown in FIG. 2. Upon identifying a relative positional relation between the vehicle V and the target parking position T in the parking space S, the relative position identification means 19' of the fifteenth embodiment shown in FIG. 33 uses the positional relation that the vehicle-side camera 7' is mounted on a front portion of the vehicle V while the relative position identification means 19 of the first embodiment shown in FIG. 2 uses the positional relation that the vehicle-side camera 7 is mounted on a rear portion of the vehicle V.

Figure 34:
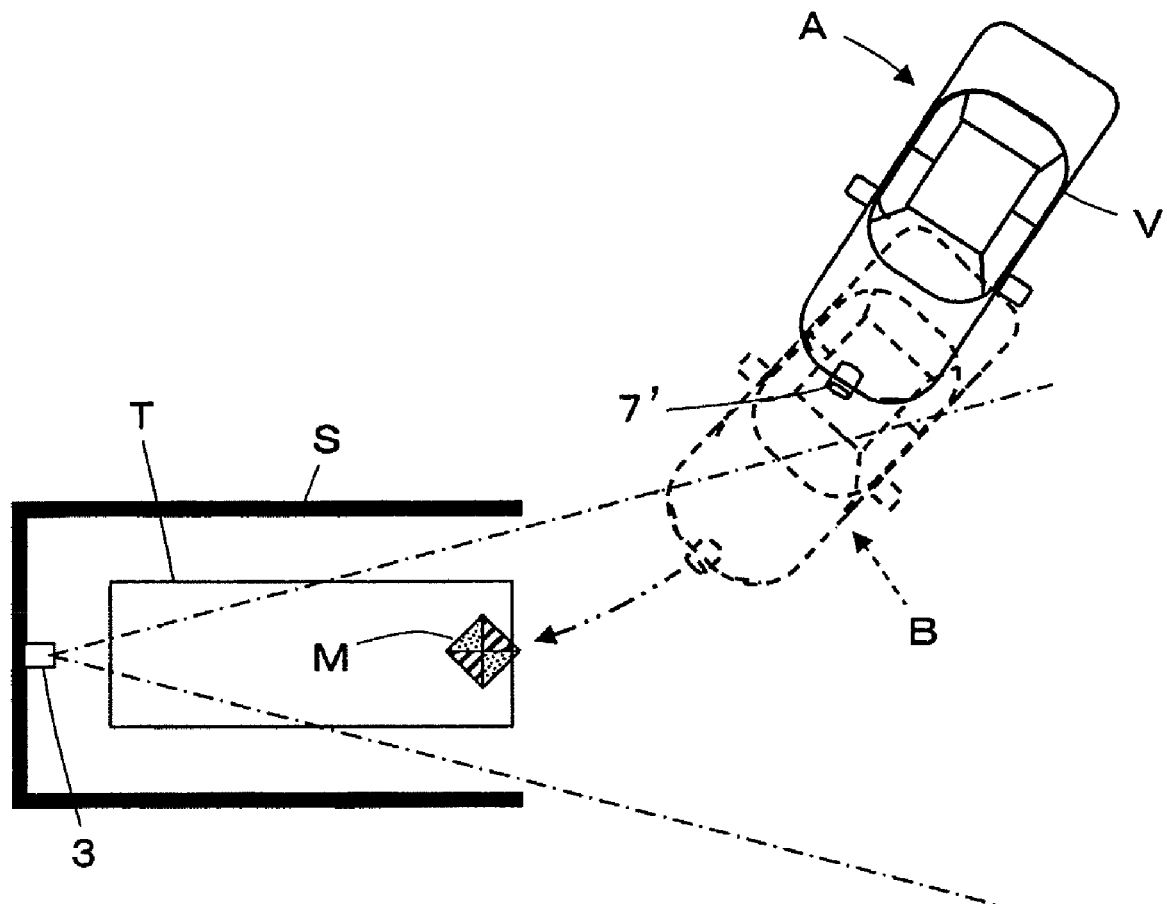
FIG. 34 is a plan view showing a positional relation between a parking space and a vehicle in the fifteenth embodiment.

In the fifteenth embodiment, as shown in FIG. 34, in a state in which the vehicle V is positioned at a location A in the vicinity of the parking space S with the mark M in the field of view of the vehicle-side camera 7', the vehicle-side camera 7' is operated by the control portion 16 of the vehicle-side apparatus 2 to take an image of the mark M.

Figure 4:
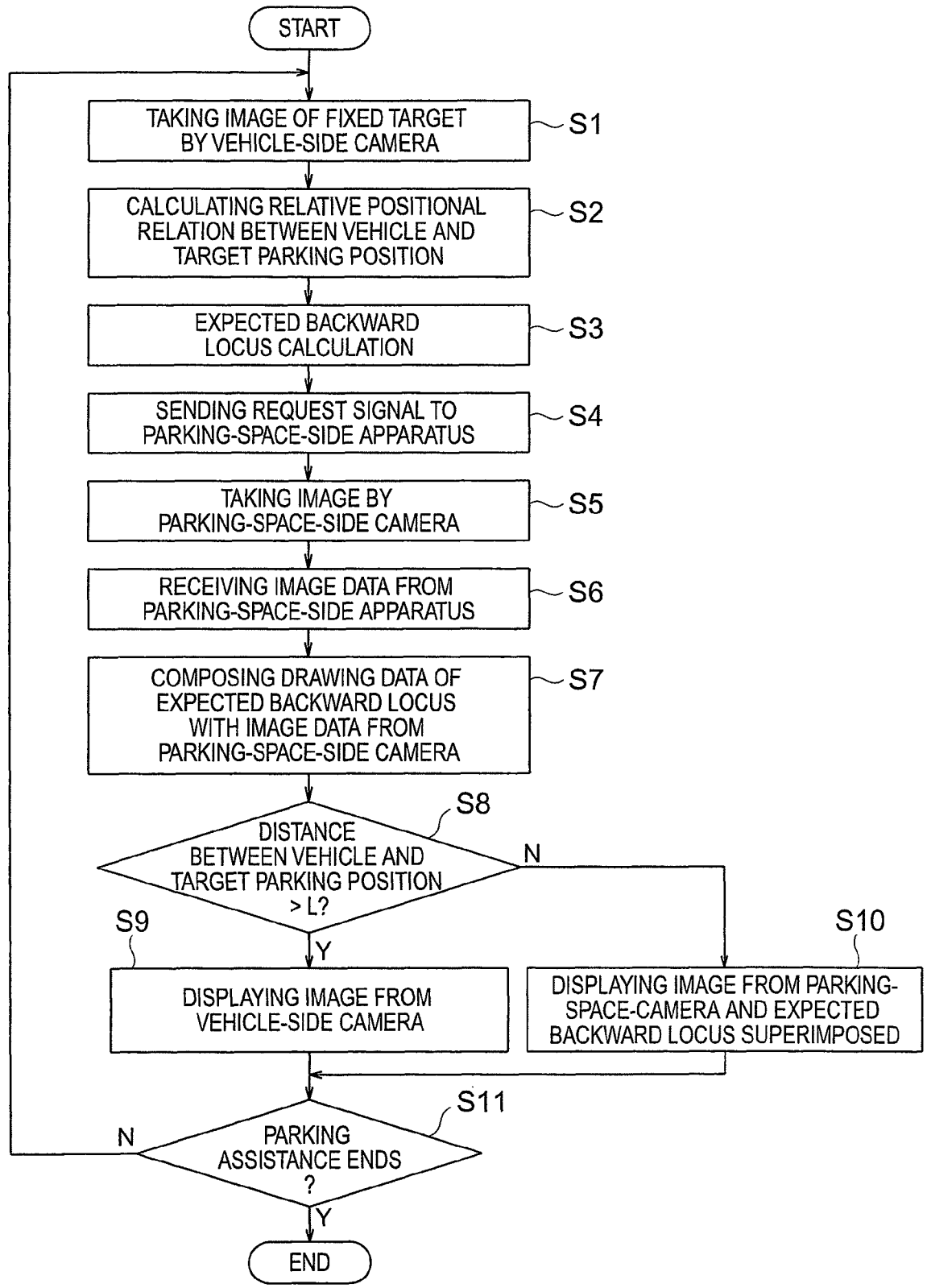
FIG. 4 is a flowchart showing an operation of the first embodiment.

In a manner similar to Step S3 in the flowchart of FIG. 4 explained in the first embodiment, the forward locus calculation portion 9' is inputted a steering angle signal from the steering angle sensor 15 and calculates an expected forward locus with reference to a road surface for when the vehicle V travels forward based on the relative positional relation between the vehicle V and the parking space S and based on a current steering angle obtained from the steering angle signal. The expected forward locus is an expected locus when the vehicle moves in the fifteenth embodiment.

According to the construction of the fifteenth embodiment, an assistance similar to that obtained in the first embodiment for backward parking can be obtained for forward parking.

Note that, in any of the second to the fourteenth embodiments described above, the vehicle-side camera 7', relative position calculation portion 8' and forward locus calculation portion 9' similar to those of the fifteenth embodiment may be provided instead of the vehicle-side camera 7, relative position calculation portion 8 and backward locus calculation portion 9 so that forward parking is assisted.

Further, the construction of any of the second to the fourteenth embodiments may be combined with the construction of the fifteenth embodiment. That is, the vehicle-side apparatus 2 may comprise the vehicle-side camera 7 for taking a rear view from the vehicle and the vehicle-side camera 7' for taking a front view from the vehicle, relative position calculation portions 8 and 8', and backward locus calculation portion 9 and forward locus calculation portion 9', and may assist both backward parking and forward parking.

In this case, the vehicle-side apparatus 2 may also comprise a parking mode selection switch for selectively indicating either backward parking mode or forward parking mode, and may be constructed so that the driver can indicate any mode by manipulating the parking mode selection switch. If the backward parking mode is indicated, the vehicle-side apparatus 2 may perform backward parking assistance similar to that of the first embodiment. If the forward parking mode is indicated, the vehicle-side apparatus 2 may perform forward parking assistance similar to that of the fifteenth embodiment.

Other Embodiments

In each of the embodiments described above, an obstacle sensor such as an ultrasonic sensor may be mounted on the vehicle V and a warning can be issued or an obstacle avoidance operation can be performed. In this case, when the existence of an obstacle on the periphery is recognized, a safer parking assist can be realized.

It is also possible to use an object, such as a wheel stop or a pattern of a wall surface of a garage, which originally exists on the periphery of the parking space as the fixed target instead of installing the mark at a predetermined place having a predetermined positional relation with respect to the parking space. However, it is preferable that the existence of the object is easy to perceive and characteristic points internally included in the object be easy to recognize.

The invention claimed is:

1. A parking assistance apparatus comprising a parking-space-side apparatus and a vehicle-side apparatus, characterized in that:

the parking-space-side apparatus includes:
a fixed target that is fixed with a predetermined positional relation with respect to a target parking position in a parking space and has at least one characteristic point;
a parking-space-side camera for taking an image of the parking space; and
a parking-space-side communication portion for transmitting an image taken by the parking-space-side camera; and the vehicle-side apparatus includes:
a vehicle-side camera for taking an image of the fixed target;
a vehicle-side communication portion for receiving the image transmitted by the parking-space-side communication portion;
a monitor located in the vicinity of a drivers seat;
a steering angle sensor for detecting a steering angle of a vehicle,
a relative position calculation portion for calculating a relative positional relation between the vehicle and the target parking position based on an image of the fixed target taken by the vehicle-side camera;
an expected locus calculation portion for calculating an expected locus when the vehicle moves based on the steering angle detected by the steering angle sensor; and
an image composition portion for displaying on the monitor information regarding parking superimposed on a background image, wherein the information regarding parking is obtained based on the relative positional relation between the vehicle and the target parking position calculated by the relative position calculation portion and based on the expected locus calculated by the expected locus calculation portion, and wherein the background image is based on the image received at the vehicle-side communication portion.

2. A parking assistance apparatus according to claim 1, wherein the image composition portion transforms the expected locus calculated by the expected locus calculation portion into drawing data in a coordinate system for an imaging screen of the parking-space-side camera and displays the transformed drawing data as information regarding parking.

3. A parking assistance apparatus according to claim 1, wherein the vehicle-side apparatus includes a parking travel distance calculation portion for calculating a travel distance of the vehicle for reaching the target parking position based on the relative positional relation between the vehicle and the target parking position calculated by the relative position calculation portion and based on the expected locus calculated by the expected locus calculation portion; and
the image composition portion displays the travel distance calculated by the parking travel distance calculation portion as information regarding parking.

4. A parking assistance apparatus according to claim 1, wherein the vehicle-side apparatus includes:
travelable area calculation portion for identifying an area travelable by the vehicle based on the relative positional relation between the vehicle and the target parking position calculated by the relative position calculation portion; and
interference determination portion for determining whether there is interference with an obstacle, in the case the vehicle travels along the expected locus, based on the travelable area calculated by the travelable area calculation portion and based on the expected locus calculated by the expected locus calculation portion, and
the image composition portion displays whether there is the interference determined by the interference determination portion as information regarding parking.

5. A parking assistance apparatus according to claim 1, wherein the relative position calculation portion includes:
image processing means for extracting the characteristic point of the fixed target based on the image of the fixed target taken by the vehicle-side camera and for recognizing a two-dimensional coordinate of the characteristic point on the image of the fixed target;
positional parameter calculation means for calculating positional parameters of the vehicle-side camera including at least a two-dimensional coordinate and a pan angle with reference to the fixed target based on two or more sets of the two-dimensional coordinates recognized by the image processing means; and
relative position identification means for identifying a relative positional relation between the vehicle and the target parking position based on the positional parameters of the vehicle-side camera calculated by the positional parameter calculation means and the predetermined positional relation of the fixed target with respect to the target parking position.

6. A parking assistance apparatus according to claim 5, wherein:
the fixed target has two or more characteristic points; and
the image processing means recognizes two or more sets of the two-dimensional coordinates of the characteristic points based on one image of the fixed target taken by the vehicle-side camera.

7. A parking assistance apparatus according to claim 6, wherein the fixed target comprises a mark of a predetermined shape.

8. A parking assistance apparatus according to claim 1, wherein:
the parking-space-side apparatus includes a plurality of the fixed targets located at different positions; and
the relative position calculation portion calculates the relative positional relation between the vehicle and the target parking position based on any of the images of the fixed targets taken by the vehicle-side camera.

9. A parking assistance apparatus according to claim 1, wherein the vehicle-side apparatus further includes an image selection portion, wherein the image selection portion:
selects an image from the vehicle-side camera if the distance between the vehicle and the target parking position is larger than a predetermined value; and
selects an image from the image composition portion if the distance is less than or equal to the predetermined value, based on the relative positional relation between the vehicle and the target parking position calculated by the relative position calculation portion, and
makes the monitor display the selected image.

10. A parking assistance apparatus according to claim 1, wherein the vehicle-side apparatus makes the monitor display the image taken by the vehicle-side camera and the image from the image composition portion concurrently.

11. A parking assistance apparatus according to claim 10, wherein the vehicle-side apparatus further includes a second image composition portion for displaying on the monitor the expected locus calculated by the expected locus calculation portion superimposed on the image taken by the vehicle-side camera.

12. A parking assistance apparatus according to claim 1, wherein the parking-space-side apparatus includes a plurality of parking-space-side cameras located at different locations, and
the vehicle-side apparatus includes a control portion for making the image composition portion use the image from a parking-space-side camera selected among the plurality of parking-space-side cameras in response to the distance between the vehicle and the target parking position based on the relative positional relation between the vehicle and the target parking position calculated by the relative position calculation portion.

13. A parking assistance apparatus according to claim 1, wherein the image composition portion:
creates a perspective image by composing the image from the vehicle-side camera and the image from the parking-space-side camera; and
displays the expected locus calculated by the expected locus calculation portion superimposed on the perspective image as the background image.

14. A parking assistance apparatus according to claim 1, wherein the vehicle-side apparatus further includes:
a parking locus calculation portion for calculating a parking locus for leading the vehicle to the target parking position based on the relative positional relation between the vehicle and the target parking position calculated by the relative position calculation portion; and
a guide apparatus for outputting drive operation guide information for traveling along the parking locus calculated by the parking locus calculation portion to a driver of the vehicle.

15. A parking assistance apparatus according to claim 14, wherein the vehicle-side apparatus further includes a sensor related to travel of the vehicle, and
the guide apparatus includes:
guide information creation portion for creating the drive operation guide information based on a detected signal from the sensor related to travel of the vehicle and based on the parking locus calculated by the parking locus calculation portion; and
a guide information output portion for outputting the guide information created by the guide information creation portion.

16. A parking assistance apparatus according to claim 1, wherein the vehicle-side apparatus further comprises:
- a parking locus calculation portion for calculating a parking locus for leading the vehicle to the target parking position based on the relative positional relation between the vehicle and the target parking position calculated by the relative position calculation portion; and
- an automatic steering apparatus for steering the vehicle automatically in order to travel along the parking locus calculated by the parking locus calculation portion.

17. A parking assistance apparatus according to claim 16, wherein the vehicle-side apparatus further includes a sensor related to travel of the vehicle, and
the automatic steering apparatus creates a steering signal for steering the vehicle automatically based on a detection signal from the sensor related to travel of the vehicle and based on the parking locus calculated by the parking locus calculation portion.

18. A parking assistance apparatus according to claim 1, wherein the vehicle-side apparatus further comprises:
- a parking locus calculation portion for calculating a parking locus for leading the vehicle to the target parking position based on the relative positional relation between the vehicle and the target parking position calculated by the relative position calculation portion; and
- an automatic traveling apparatus for moving the vehicle automatically in order to travel along the parking locus calculated by the parking locus calculation portion.

19. A parking assistance apparatus according to claim 18, wherein the vehicle-side apparatus further includes a sensor related to travel of the vehicle, and
the automatic traveling apparatus creates a traveling signal for moving the vehicle automatically based on a detection signal from the sensor related to travel of the vehicle and based on the parking locus calculated by the parking locus calculation portion.

20. A parking assistance apparatus according to claim 1, wherein the fixed target is displayed by means of light.

21. A parking assistance apparatus according to claim 20, wherein the fixed target is displayed by projecting or scanning light.

22. A parking assistance apparatus according to claim 20, wherein the fixed target emits light by itself.

23. A parking assistance apparatus according to claim 1, wherein the expected locus when the vehicle moves is an expected backward locus for when the vehicle travels backward, and
the expected locus calculation portion is a backward locus calculation portion for calculating the expected backward locus.

24. A parking assistance apparatus according to claim 1, wherein the expected locus when the vehicle moves is an expected forward locus for when the vehicle travels forward, and
the expected locus calculation portion is a forward locus calculation portion for calculating the expected forward locus.

25. A vehicle-side apparatus of a parking assistance apparatus characterized in that it comprises:
- a vehicle-side camera for taking an image of a fixed target;
- a vehicle-side communication portion for receiving an image transmitted by a parking-space-side apparatus, the parking-space-side apparatus including:
  - a fixed target that is fixed with a predetermined positional relation with respect to a target parking position in a parking space and has at least one characteristic point;
  - a parking-space-side camera for taking an image of the parking space; and
  - a parking-space-side communication portion for transmitting an image taken by the parking-space-side camera;
- a monitor located in the vicinity of a drivers seat;
- a steering angle sensor for detecting a steering angle of a vehicle,
- a relative position calculation portion for calculating a relative positional relation between the vehicle and the target parking position based on the image of the fixed target taken by the vehicle-side camera;
- an expected locus calculation portion for calculating an expected locus when the vehicle moves based on the steering angle detected by the steering angle sensor; and
- an image composition portion for displaying information regarding parking superimposed on a background image, wherein the information regarding parking is obtained based on the relative positional relation between the vehicle and the target parking position calculated by the relative position calculation portion and based on the expected locus calculated by the expected locus calculation portion, and wherein the background image is based on the image received at the vehicle-side communication portion.

* * * * *